(12) United States Patent
Thomas

(10) Patent No.: US 11,117,545 B2
(45) Date of Patent: Sep. 14, 2021

(54) SYSTEM AND METHOD FOR DETERMINING SEATBELT ROUTING

(71) Applicant: GM Global Technology Operations LLC, Detroit, MI (US)

(72) Inventor: Scott D. Thomas, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 217 days.

(21) Appl. No.: 16/389,490

(22) Filed: Apr. 19, 2019

(65) Prior Publication Data

US 2020/0331428 A1 Oct. 22, 2020

(51) Int. Cl.
*B60R 22/48* (2006.01)

(52) U.S. Cl.
CPC ...... *B60R 22/48* (2013.01); *B60R 2022/4816* (2013.01); *B60R 2022/4825* (2013.01); *B60R 2022/4858* (2013.01); *B60R 2022/4866* (2013.01)

(58) Field of Classification Search
CPC ............ B60R 22/48; B60R 2022/4816; B60R 2022/4825; B60R 2022/4858; B60R 2022/4866
USPC .......................................................... 701/45
See application file for complete search history.

(56) References Cited

U.S. PATENT DOCUMENTS

| | | | | |
|---|---|---|---|---|
| 7,752,925 B2* | 7/2010 | Koors | ..................... | B60R 22/48 73/862.391 |
| 7,992,669 B2* | 8/2011 | Odate | ..................... | B60R 22/46 180/268 |
| 8,109,460 B2* | 2/2012 | Odate | ..................... | B60R 22/44 242/374 |
| 8,165,758 B2* | 4/2012 | Odate | ..................... | B60R 22/46 701/45 |
| 10,717,408 B1* | 7/2020 | Kim | ..................... | G08B 21/22 |
| 2009/0079178 A1* | 3/2009 | Odate | ..................... | B60R 22/02 280/807 |
| 2010/0117438 A1* | 5/2010 | Takao | ..................... | B60R 22/34 297/475 |
| 2010/0121533 A1* | 5/2010 | Takao | ..................... | B60R 22/44 701/45 |

(Continued)

FOREIGN PATENT DOCUMENTS

| CN | 110654343 A | * | 1/2020 | |
|---|---|---|---|---|
| GB | 2559663 A | * | 8/2018 | ............. B60R 22/48 |

(Continued)

*Primary Examiner* — Atul Trivedi

(57) ABSTRACT

A system and method for detecting seatbelt routing in a motor vehicle safety restraint system. The system includes a seatbelt buckle sensor, an occupant sensor, a seatbelt payout sensor, and a control module. The method includes sensing a presence of a seatbelt latchplate in the seatbelt buckle. Further, the method determines whether the seatbelt is buckled. Additionally, the method includes sensing a presence of occupant in a vehicle seat. Moreover, the method further includes determining whether the occupant is detected in the vehicle seat. The method senses a seatbelt payout length and compares the seatbelt payout length to a first seatbelt payout length threshold. Thereafter, the method determines seatbelt routing based on whether the seatbelt is buckled, an occupant is present, and a seatbelt payout length has exceeded the first seatbelt payout length threshold.

22 Claims, 11 Drawing Sheets

(56) References Cited

U.S. PATENT DOCUMENTS

| | | | |
|---|---|---|---|
| 2010/0125392 A1* | 5/2010 | Takao | B60R 22/02 701/45 |
| 2010/0243363 A1* | 9/2010 | Tanaka | B60R 22/02 180/268 |
| 2011/0270493 A1* | 11/2011 | Tanaka | B60R 22/46 701/45 |
| 2014/0265292 A1* | 9/2014 | Nagasawa, Sr. | B60R 22/26 280/807 |
| 2014/0303851 A1* | 10/2014 | Nagasawa, Sr. | B60R 22/02 701/45 |
| 2015/0283974 A1* | 10/2015 | Schlittenbauer | B60R 22/02 701/45 |
| 2016/0244020 A1* | 8/2016 | Umakoshi | B60R 22/46 |
| 2016/0355157 A1* | 12/2016 | Cech | A44B 11/2565 |
| 2017/0021796 A1* | 1/2017 | Hayashi | A44B 11/2561 |
| 2017/0088096 A1* | 3/2017 | Luebbers | B60R 22/48 |
| 2017/0291576 A1* | 10/2017 | Le | B60R 21/01548 |
| 2017/0296128 A1* | 10/2017 | Aoki | A61B 5/024 |
| 2018/0126949 A1* | 5/2018 | Turnwald | B60R 22/48 |
| 2018/0148014 A1* | 5/2018 | Le | B60R 22/48 |
| 2019/0152418 A1* | 5/2019 | Coughlin | B60R 21/01566 |
| 2019/0193676 A1* | 6/2019 | Thomas | B60R 22/48 |
| 2019/0197326 A1* | 6/2019 | Ohno | B60R 22/12 |
| 2019/0256040 A1* | 8/2019 | Romero Elizondo | B60R 22/415 |
| 2019/0344748 A1* | 11/2019 | Lin | B60R 22/42 |
| 2019/0359168 A1* | 11/2019 | Roo | B60R 22/48 |
| 2020/0282949 A1* | 9/2020 | Yamamoto | B60R 22/10 |
| 2020/0298794 A1* | 9/2020 | Dingli | B60R 22/48 |
| 2020/0298795 A1* | 9/2020 | Sokolowski | B60R 11/0217 |
| 2020/0331415 A1* | 10/2020 | Thomas | B60R 21/01552 |

FOREIGN PATENT DOCUMENTS

| | | | | |
|---|---|---|---|---|
| WO | WO-2018173029 A1 | * | 9/2018 | B60R 22/024 |
| WO | WO-2019149740 A1 | * | 8/2019 | B60R 22/12 |

* cited by examiner

SYSTEM AND METHOD FOR DETERMINING SEATBELT ROUTING

INTRODUCTION

The present disclosure relates to methods for detecting seatbelt webbing routing from a seatbelt retractor to a seatbelt buckle.

Seatbelt systems for restraining occupants in a motor vehicle, generally, employ seatbelt retractors. The seatbelt retractors have a spool around which a seatbelt webbing is wound. The seatbelt webbing may be unwound from the spool by a vehicle occupant and secured around the vehicle occupant by inserting a latch plate coupled to the seatbelt webbing into a seatbelt buckle. When not in use the seatbelt retractor through the aid of a spring retracts the seatbelt webbing into one or more retractor spools. Moreover, seatbelt systems have employed a sensor in the seatbelt buckle to determine whether an occupant is buckled. When the occupant is unbuckled a message or alert is provided to the occupant to prompt the occupant to buckle the seatbelt.

Thus, while current seatbelt routing detection methods achieve their intended purpose, there is a need for a new and improved system and method for securing vehicle occupants with a seatbelt and detecting the routing of the seatbelt. The new and improved method should be capable of determining seatbelt routing and provide a message to the vehicle occupant or take an appropriate ride action when different seatbelt routings are detected.

SUMMARY

According to several aspects, a system and method for detecting seatbelt routing in a motor vehicle safety restraint system is provided. The system includes a seatbelt buckle sensor, an occupant sensor, a seatbelt payout sensor, and a control module. The control module includes executable code to implement the method of the present disclosure. The method includes sensing a presence of a seatbelt latchplate in the seatbelt buckle. Further, the method determines whether the seatbelt is buckled. Additionally, the method includes sensing a presence of occupant in a vehicle seat. Moreover, the method further includes determining whether the occupant is detected in the vehicle seat. The method senses a seatbelt payout length and compares the seatbelt payout length to a first seatbelt payout length threshold. Thereafter, the method determines seatbelt routing based on whether the seatbelt is buckled, an occupant is present, and a seatbelt payout length has exceeded the first seatbelt payout length threshold.

In accordance with another aspect of the present disclosure, the method further includes issuing at least one of a message and a ride action when the seat belt is not buckled and an occupant is detected.

In accordance with yet another aspect of the present disclosure, the method further includes issuing at least one of a message and a ride action when the seatbelt is not buckled, an occupant is not detected, and the seatbelt payout length is more than the first seatbelt payout length threshold.

In accordance with still another aspect of the present disclosure, the method further includes issuing at least one of a message and a ride action when the seat belt is buckled, an occupant is detected and an occupant status has changed.

In accordance with yet another aspect of the present disclosure, the method further includes issuing at least one of a message and a ride action when the seat belt is buckled, an occupant is detected, an occupant status has not changed and seatbelt payout length has exceeded a change payout length threshold from a stored payout length.

In accordance with yet another aspect of the present disclosure, the method further includes saving the payout length from a past cycle when the seatbelt is buckled, an occupant is detected, an occupant status has not changed and the seatbelt payout length has not changed more than a change payout threshold from the stored payout length.

In accordance with yet another aspect of the present disclosure, the method further includes issuing at least one of a message and a ride action when the seatbelt is buckled, an occupant is detected, and the seatbelt payout length has decreased more than a first payout length decrease threshold from a stored static length.

In accordance with yet another aspect of the present disclosure, the method further includes issuing at least one of a message and a ride action when the seat belt is buckled, an occupant is detected, and the seatbelt payout length has not decreased more than a first payout length decrease threshold from a stored static length and has decreased by more than a second payout length decrease threshold from the stored static length.

In accordance with yet another aspect of the present disclosure, the method further includes issuing at least one of a message and a ride action when the seatbelt is buckled, an occupant is detected, and a stored static length is more than a first stored static length threshold and the seatbelt payout length is greater than a first pullout length threshold beyond a stored static length.

In accordance with yet another aspect of the present disclosure, the method further includes issuing at least one of a message and a ride action when the seatbelt is buckled, an occupant is detected, and the stored static length is more than a first stored static length threshold and the seatbelt payout length is between a second and third pullout length threshold beyond the stored static length and a past seatbelt payout length was more than a first pullout length threshold beyond the stored static length.

In accordance with yet another aspect of the present disclosure, the method further includes issuing at least one of a message and a ride action when the seatbelt is buckled, an occupant is detected, and the stored static length is more than a first stored static length threshold and the seatbelt payout length is between a first and second pullout length threshold beyond the stored static length and a previously stored seatbelt payout length was less than the first static length threshold beyond the stored static length.

In accordance with yet another aspect of the present disclosure, issuing at least one of a message and a ride action when the seat belt is buckled, the stored static length is less than a first stored static length threshold, and an occupant is detected.

In accordance with yet another aspect of the present disclosure, the method further includes issuing at least one of a message and a ride action when the seat belt is buckled, stored static length is less than a first stored static length threshold, an occupant is not detected, seatbelt payout length is greater than a second payout length threshold while buckled, and an occupant is detected at least one of during and after a seatbelt payout length increase.

In accordance with yet another aspect of the present disclosure, the method further includes issuing at least one of a message and a ride action when the seatbelt is buckled, stored static length is less than a first stored static length threshold, an occupant is not detected, a seatbelt payout length increase is greater than the second payout length threshold while buckled, and an occupant is not detected at least one of during and after the seatbelt payout length increase.

In accordance with yet another aspect of the present disclosure, the method further includes issuing at least one of a message and a ride action when the seatbelt is buckled, stored static length is less than a second stored static length threshold, an occupant is not detected, and the seatbelt payout length is at least one of greater than and less than a third payout length threshold.

In accordance with yet another aspect of the present disclosure, the method further includes issuing at least one of a message and a ride action when the seat belt is buckled, and a seatbelt payout length is less than the first payout length threshold.

In accordance with yet another aspect of the present disclosure, the method further includes issuing at least one of a message and a ride action when the seat belt is buckled, an occupant is detected, and at least one of the seatbelt payout length exceeds the first payout length threshold, the seatbelt is retracted at least one of at a rate exceeding a payout rate threshold, and the seatbelt payout length is between a second payout length threshold and a third payout length threshold.

In accordance with yet another aspect of the present disclosure, the method further includes adjusting at least one of a stored static length threshold and the first seatbelt payout length threshold when the vehicle seat is moved.

In accordance with yet another aspect of the present disclosure, the method further includes comparing a seatbelt payout length to a seat movement distance to determine whether the difference between the seatbelt payout length and the seat movement distance exceeds a seat difference threshold.

In accordance with yet another aspect of the present disclosure, the method further includes adjusting at least one of a stored static length threshold and the first seatbelt payout length threshold when a seatbelt guide loop is moved.

In accordance with yet another aspect of the present disclosure, the method further includes comparing the seatbelt payout length to seatbelt guide loop movement distance to determine whether the difference between the seatbelt payout length and seatbelt guide loop movement distance exceeds a guide loop difference threshold.

In accordance with yet another aspect of the present disclosure, the method further includes changing a message or ride action based on at least one of time and a vehicle motion.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
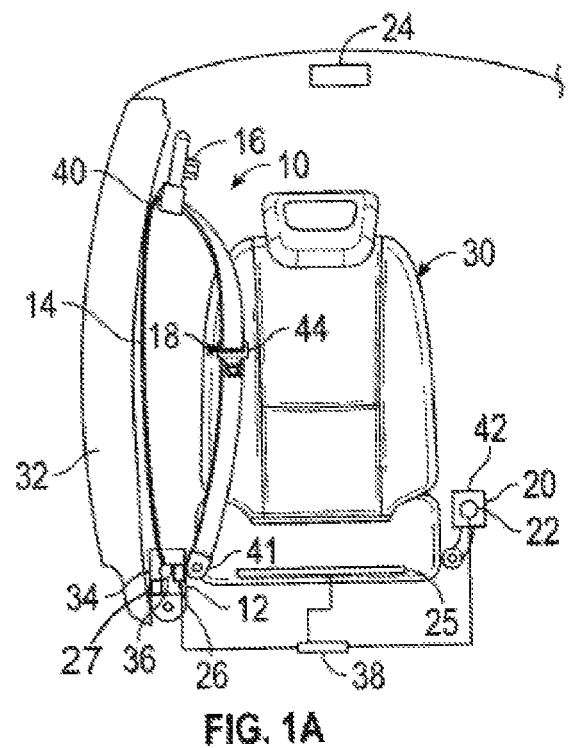
FIG. 1A is a front perspective view of a vehicle seat and a safety restraint system including a retractor mounted proximate the bottom cushion of a vehicle seat, according to an exemplary embodiment.

Referring to FIG. 1A, a safety restraint system 10 for a motor vehicle is illustrated, in accordance with an embodiment of the invention. Safety restraint system 10 includes a seatbelt retractor 12, a seatbelt webbing 14, a guide loop 16, a latchplate 18, a buckle 20, a seatbelt buckle sensor 22, an occupancy sensor 24, a seatbelt webbing payout sensor 26 and an automatic locking retractor (ALR) sensor 27. Seatbelt retractor 12 may include an automatic locking mechanism and, thus, would be referred to as an automatic locking retractor. If seatbelt retractor 12 is an ALR, seatbelt retractor 12 also includes ALR sensor 27 that senses the engagement and disengagement of the automatic locking mechanism. Seatbelt retractor 12 is fixed to a structural member of the motor vehicle adjacent a vehicle seat 30. For example, seatbelt retractor 12 is bolted to the base of the B-pillar 32 or other structural member of the vehicle. Alternatively, the seat belt retractor 12 may be integrated with and fixedly attached to the base of the seat 30 of the motor vehicle. A frame 34 of seatbelt retractor 12 is configured to rotatably support a spool 36 for free rotation in the retractor 12.

A spring (not shown) is operatively attached to the retractor frame 34 at one end of the spring and to the spool 36 at another end of the spring to retract the seatbelt webbing 14 onto the spool 36 and into the retractor 12. The seatbelt webbing 14 is at least partially wound around the spool 36 for storing the seatbelt webbing 14 in the retractor 12 when the safety restraint system 10 is not in use. When the safety restraint system 10 is in use the seatbelt webbing 14 is unwound from the spool 36 and pulled out of the retractor 12 by a vehicle occupant. The seatbelt webbing 14 is typically made of a woven fabric material such as woven nylon or polyester.

The seatbelt webbing payout sensor 26 is in communication with the retractor spool 36. Webbing payout sensor 26 is configured to sense the rotation of the retractor spool 36. A control module or microprocessor control system 38 receives a spool rotation signal from the webbing payout sensor 26 and is configured to determine the length of webbing payout from the rotation of the spool 36 of the retractor 12. The seatbelt webbing payout sensor 26 may also be used to detect the engagement or disengagement of the automatic locking mechanism in the ALR.

Guide loop 16 is fixedly secured to the motor vehicle, generally, towards the top of the B-pillar 32 of the motor vehicle. An optional slot 40 is provided in guide loop 16 that receives and slidably engages the seatbelt webbing 14. The seatbelt webbing 14 generally extends from the retractor 12 up and along the B-pillar 32 and is threaded or routed through guide loop 16 where the seatbelt webbing 14 is directed down toward the base of the seat 30 and is secured at a terminal end 41 to a structural member of the motor vehicle or to the seat 30.

The latchplate 18 has a slot 44 through which the seatbelt webbing is threaded to slidably engage the latchplate 18 with the seatbelt webbing 14. The latchplate 18 is located on the seatbelt webbing 14, generally, between the guide loop 16 and the terminal end 41 of the seatbelt webbing 14. The buckle 20 is configured to releasably capturing the latchplate 18. Typically, latchplate 18 is pressed into a slot 42 in buckle 20. After the latchplate 18 is fully inserted into the buckle 20 the latchplate 18 is locked in the buckle 20. A button on the buckle 20 is depressed to release the latchplate 18 from buckle 20.

The seatbelt buckle sensor 22 is provided in the seatbelt buckle 20. Buckle sensor 22 is configured to sense the presence of the latchplate 18. Buckle sensor 22 transmits a control signal to the microprocessor control system 38. The microprocessor control system 38 includes a control algorithm that receives the control signal from the buckle sensor 22 and determines whether the latchplate 18 is present in the seatbelt buckle 20.

One or more occupancy sensors 24, 25 are provided to sense the presence of an occupant in the vehicle seat 30. Occupancy sensor 24 is adjacent the vehicle seat 30. Occupancy sensor 25 is disposed in the vehicle seat 30. Occupancy seat sensor 25 assess occupant presence via different means such as one or more pressure pads, weight pads, load cells, resistive pads and biometric sensors. Occupancy sensor 24 would assess occupant presence via different means, such as via one or more cameras, RADARs, ultra-sonic sensors, infrared sensors, etc. Occupancy sensors 24, 25 are configured to sense the presence of a vehicle occupant in the vehicle seat 30. Each occupancy sensor 24, 25 transmits a control signal to the microprocessor control system 38. The microprocessor control system 38 includes a control algorithm that receives the control signal from the occupancy sensors 24, 25 and determines whether the occupant is present in the vehicle seat 30. Occupancy sensors 24, 25 may detect certain objects as occupants. Occupancy sensors 24, 25 may have one or more detection thresholds to distinguish occupants from objects, detect the size of the occupant and detect the location of the occupant relative to the seating surface of vehicle seat 30.

Figure 1B:
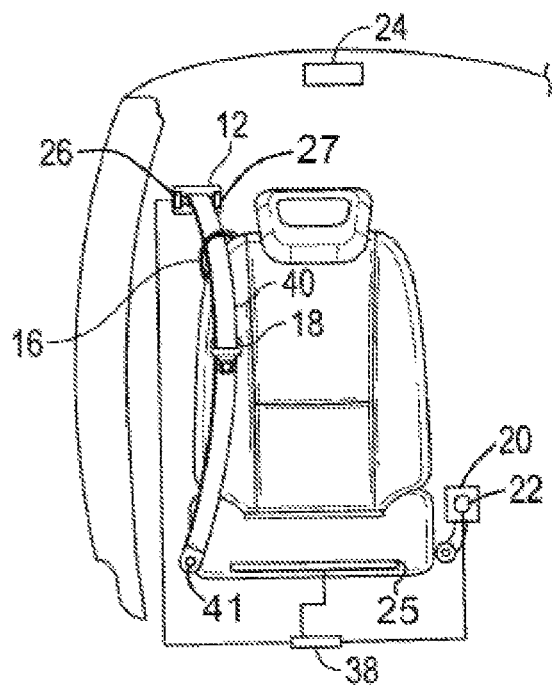
FIG. 1B is a front perspective view of a vehicle seat and a safety restraint system including a shelf mount retractor, according to an exemplary embodiment.
Figure 1C:
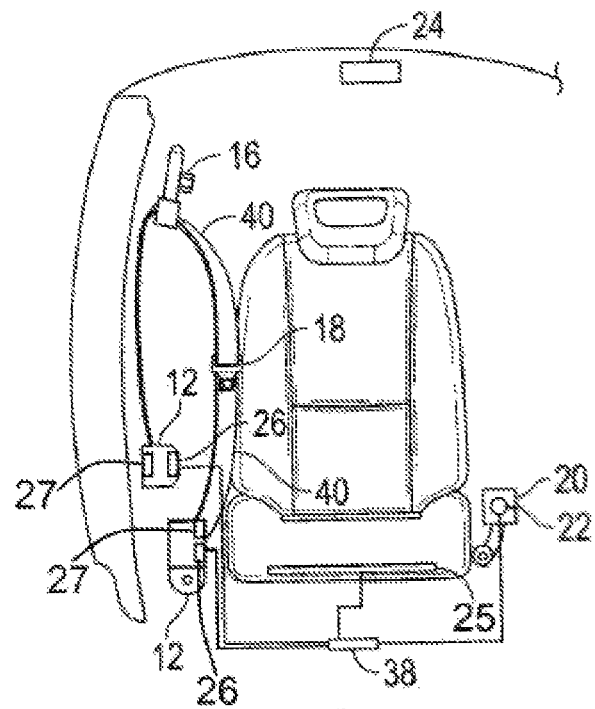
FIG. 1C is a front perspective view of a vehicle seat and a safety restraint system including two retractors mounted proximate the bottom cushion of a vehicle seat, according to an exemplary embodiment.
Figure 1D:
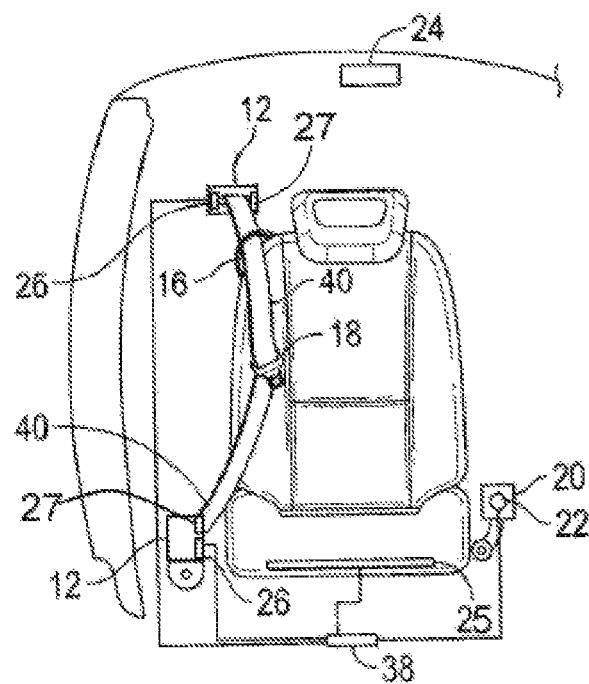
FIG. 1D is a front perspective view of a vehicle seat and a safety restraint system including a shelf mounted retractor and a retractor mounted proximate the bottom cushion of a vehicle seat, according to an exemplary embodiment.
Figure 10:
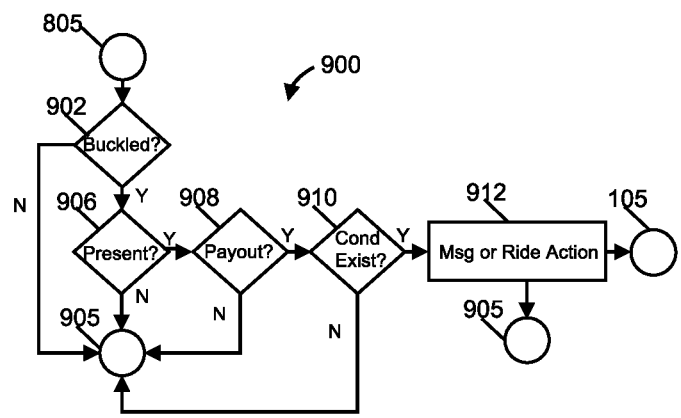
FIG. 10 is a flow chart illustrating a method for determining a seatbelt routing from a seatbelt retractor to a seatbelt buckle such as whether the shoulder belt portion of the seatbelt is routed behind the back of the occupant, according to an exemplary embodiment.

FIGS. 1B, 10 and 1D show alternative seatbelt arrangements. FIG. 1B shows a shelf mount location for the retractor 12 and the guide loop 16 is mounted to or in proximity of the seat 30. FIGS. 10 and 1D show seatbelt systems with two retractors 12. One or both of the retractors 12 have a webbing payout sensor 26. Each webbing payout sensor 26 transmits a control signal to the microprocessor control system 38. The latchplate 18 is sewn into seat belt webbing 14. For embodiments having two webbing payout sensors 26, the method utilizes the two measured payout lengths together. In one embodiment of the present invention, a correction factor is multiplied into one or both payout lengths to produce a more accurate determination by the method of the present disclosure. In another embodiment, systems with two payout sensors 26 the method considers each of the payout lengths individually with different thresholds and runs each routine separately for each sensor input.

The present disclosure includes a plurality of algorithms or methods for determining the seatbelt routing of safety restraint system 10 based on the receipt and processing by microprocessor control system 38 of the control signals from the seatbelt buckle sensor 20, the occupancy sensors 24 and the seatbelt payout sensors 26. Microprocessor control system 38 includes computer memory to store the plurality of algorithms or methods. Moreover, microprocessor control system 38 includes a processor to execute the computer code that defines the plurality of algorithms or methods. The plurality of algorithms or methods utilize the control signals provided by the seatbelt buckle sensor 20, an occupancy sensor 24 and seatbelt payout sensors 26 to determine the seatbelt routing, decide whether the determined routing requires a message or a ride action and either issue a message to the vehicle occupant or active a ride action. The plurality of algorithms or methods are described herein below.

Figure 2:
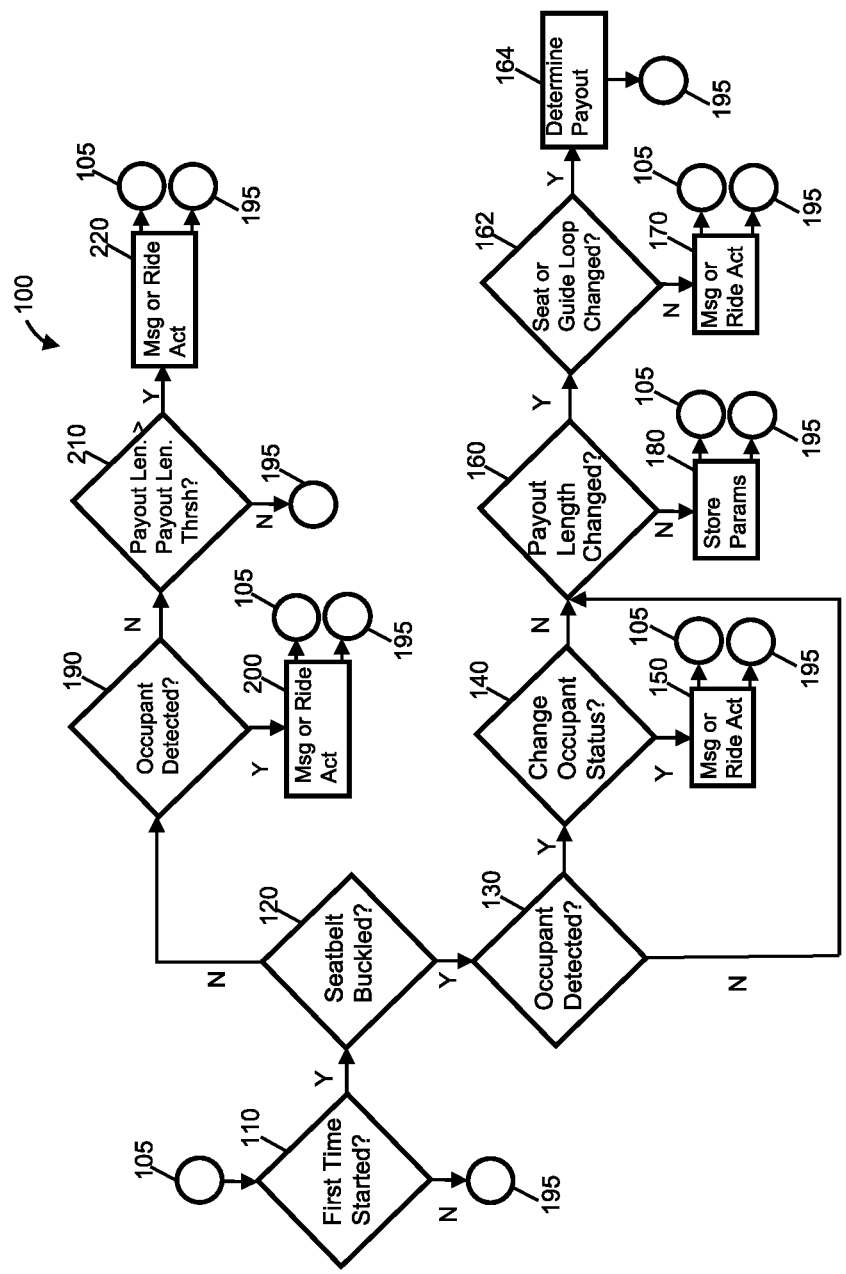
FIG. 2 is a flowchart illustrating a method for determining a seatbelt routing from a seatbelt retractor to a seatbelt buckle such as an unbelted occupant, a non-retracting seatbelt and a stowed seatbelt, according to an exemplary embodiment.

Referring now to FIG. 2, a flowchart illustrating a method 100 for detecting seatbelt routing is illustrated, in accordance with the present invention. More specifically, method 100 is configured to determine a plurality of seatbelt routing conditions such as an unbelted occupant, a non-retracting seatbelt and a stowed seatbelt, for example. The method 100 starts at block 105. At block 110, a determination is made whether method 100 started for the first time. If at block 110 the method 100 is determined not to have started for the first time, then the method 100 continues at block 195 to the next routing detection algorithm or method 300. If at block 110 the seatbelt routing method 100 is determined to have started for the first time, the method 100 continues at block 120 where a determination is made whether the seatbelt is buckled. If the seatbelt is determined to be buckled at block 120, then the method 100 continues at block 130 where a determination is made whether an occupant is detected in the vehicle seat 30. If an occupant is determined to be present in the vehicle seat 30, then the method 100 continues at block 140 where a determination is made whether an occupant status has changed from last key off or system shutdown. For example, a change in occupant status is when an occupant has vacated the seat, an occupant has occupied a seat, the detected size/mass or detected position of the occupant in the seat changes from the previous state beyond a predetermined amount. If at block 140 a determination is made that the occupant status has changed then the method 100 continues at block 150 where a message is provided to the vehicle occupants, a ride action is taken, and/or parameters are stored. For example, a measured stored static length, restraint/seat status and occupant/child restraint seat (CRS) classification/posture is stored. The message provided to the vehicle occupants are visual, audible, haptic, or a combination thereof. For example, the messages and ride actions that may be taken are: a) instructing the occupant to unbuckle and re-buckle, b) preventing the ride from starting, c) taking the vehicle and parking the vehicle in a local low risk location, and d) remotely resetting the system, view the interior environment to assess the situation or dialogue with the occupant and e) turning on a message icon, making an audible sound, vibrating a seat or some combination thereof. After block 150 the method returns to block 105. Alternately, after block 150 in another embodiment of the present disclosure the method returns to block 195.

Stored static length is determined when the seatbelt is buckled. The approach used could be a calibratable input or could be hard coded into the method 300. For example stored static length is: a) the actual payout length when the seatbelt is buckled, b) the average payout length over a predetermined time window starting at the time the seatbelt is buckled, c) the minimum payout length over a predetermined time window starting at the time of seatbelt buckling (to account for an occupant leaning forward or twisting while or right after buckling), d) the average or minimum payout length between a predetermined time window that starts and stops at predetermined times after buckling, e) the minimum payout length before the seatbelt payout increases (or increases beyond a predetermined amount), and alternatively limited to within a predetermined time window after buckling, f) if the ALR function in the seatbelt retractor has activated, then the stored static length is the minimum payout length within a predetermined time window after ALR activation, and g) if a buckled occupant is present in the vehicle seat, any of the above stored static length determination methods may be used to determine stored static length, however, the stored static length is determined after the buckled occupant has retracted the seatbelt to remove slack in the seatbelt webbing. For the above enumerated examples, the window for determining the stored static length is alternatively terminated once the rate of seatbelt webbing retraction exceeds a predetermined rate that is either a calibrated input or hard coded into the method 100.

If at block 140, a determination is made that the occupant status has not changed then the method 100 continues at block 160 where a determination is made whether the seatbelt payout length has changed by more than a change payout length threshold from the seatbelt payout length saved when the method 100 was stopped at last key off or system shutdown. If at block 130, a determination is made that an occupant is not present in the vehicle seat 30, then the method 100 continues at block 160 where a determination is made whether the seatbelt payout length has changed by more than the change payout length threshold from the seatbelt payout length saved when method 100 was stopped at last key off or system shutdown. If at block 160 a determination is made that the seatbelt payout length has changed by more than the change payout length threshold from the seatbelt payout length saved when the method 100 was stopped at last key off or system shutdown, then the method 100 continues at block 162 where a determination is made whether either the vehicle seat 30 or the guide loop 16 has changed position by more than a seat movement threshold or a guide loop movement threshold.

Figure 14:
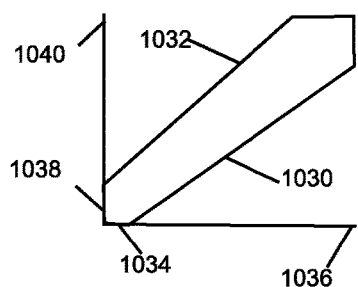
FIG. 14 is a chart of the range of acceptable seatbelt payout lengths for a given seat movement in order to confirm that the measured seatbelt payout length is correct, according to an exemplary embodiment.

If the seat has moved more than a seat movement threshold, then method 100 proceeds to block 164 where the seatbelt payout length is determined according to a seat threshold adjustment chart shown in FIG. 14. The seatbelt payout length is stored as stored static length. In addition, other parameters can be stored such as the occupant classification, the occupant's posture, the seatbelt buckle status, the seat location, the guide loop location, and any decision to enable or suppress deployment of specific restraints such as one or more pretensioners or one or more airbags. The method 100 continues at block 195 to the next routing detection method 300.

Figure 17:
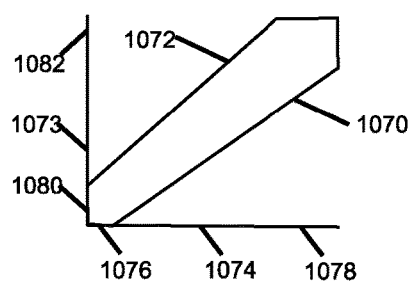
FIG. 17 is a chart showing the range of acceptable seatbelt payout lengths for a given guide loop movement in order to confirm that the measured payout length is correct, according to an exemplary embodiment.

If the guide loop 16 has moved more than a guide loop movement threshold, then method 100 proceeds to block 164 where a seatbelt payout length is determined according to a guide loop threshold adjustment graph shown in FIG. 17. The seatbelt payout length is stored as stored static length. In addition, other parameters can be stored such as the occupant classification, the occupant's posture, the seatbelt buckle status, the seat location, the guide loop location, and any decision to enable or suppress deployment of specific restraints. The method 100 continues at block 195 to the next routing detection method 300.

If the seat and the guide loop have not moved more than a seat movement threshold and a guide loop movement threshold, then the method 100 continues at block 170 where a message is provided to the vehicle occupants, a ride action is taken and/or parameters are stored. Messages are visual, audible, haptic, or a combination thereof. For example, the messages and ride actions that are taken are: a) instructing the occupant to unbuckle and re-buckle, b) preventing the ride from starting, c) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination of these. Parameters can be stored such as the occupant classification, the stored static length of the seatbelt, the occupant posture, the seatbelt buckle status, the seat location, the guide loop location, and any decision to enable or suppress deployment of specific restraints. The seatbelt payout length saved is either the seatbelt payout length when the method 100 was stopped or the stored static length when the method 100 was stopped. The approach used may be a calibratable input or could be hard coded into the method 100. From block 170, the method returns to block 105. Alternately, after block 170 in another embodiment of the present disclosure the method 100 returns to block 195.

If at block 160 the seatbelt payout length has not changed by more than the change payout length threshold, then the method 100 continues at block 180 where parameters are stored such as the payout length from the past cycle is saved by microprocessor control system 38. The seatbelt payout length is either the stored static length measured at the time the seatbelt was buckled in the previous cycle or the length at vehicle key-off. The approach used could be a calibratable input or could be hard coded into the method 100. Other parameters can be stored such as the occupant classification, the occupant's posture, the seatbelt buckle status, the seat location, the guide loop location, and a decision to enable or suppress deployment of one or more pretensioners or one or more airbags. After block 180, the method continues to the block 195 to the next routing detection method 300.

If a determination is made that the seatbelt is not buckled at block 120 then the method 100 continues at block 190 where a determination is made whether an occupant is detected in the vehicle seat. If at block 190 an occupant is detected in the vehicle seat, then the method 100 continues to block 200 where a message is provided to the vehicle occupants, a ride action is taken, and/or parameters are stored. Messages are visual, audible, haptic, or a combination thereof. Examples of messages and ride actions are: a) instructing the occupant to buckle, b) instructing the occupant to buckle in the object on the seat, c) instructing the occupant to move the object in the seat to a more suitable cargo storage location, d) preventing the ride from starting, e) taking the vehicle and parking the vehicle in a local low risk location, f) contacting the home office that oversees the vehicle service to reset the system, view the interior environment to assess the situation or dialogue with the occupant and e) turning on a message icon, making a dinging sound, vibrating a seat or some combination thereof. Parameters can be stored such as the occupant classification, the stored static length of the seatbelt, the occupant's posture, the seatbelt buckle status, the seat 30 location, the guide loop 16 location, and any decision to enable or suppress deployment of one or more pretensioners or one or more airbags. After block 200, the method returns to initial block 105. Alternately, in another embodiment of the present disclosure after block 200 the method 100 returns to block 195.

If an occupant is not detected in the vehicle seat at block 190, then the method 100 continues at block 210 where a determination is made whether the seatbelt payout length is greater than a first payout length threshold. If at block 210 the seatbelt payout is greater than the first payout length threshold, then the method 100 continues at block 220 where a message is provided to the vehicle occupants, a ride action and/or storage of parameters is taken. Messages are visual, audible, haptic, or a combination thereof. For example, the messages and ride actions that are taken are: a) instructing the occupant to fully stow the seatbelt, b) preventing the ride from starting, c) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination of these. Parameters can be stored such as the occupant classification, the stored static length of the seatbelt, the occupant's posture, the seatbelt buckle status, the seat 30 location, the guide loop 16 location, and any decision to enable or suppress deployment of specific restraints. After block 220, the method 100 returns to block 105. Alternately, after block 220 in another embodiment of the present disclosure the method 100 returns to block 195. If at block 210, the seatbelt payout is less than the first payout length threshold, then the method 100 continues to block 195 to the next routing detection method 300. Alternatively, in method 100, the order of block 120 and blocks 130, 190 could be reversed so that block 130 proceeds block 120.

Figure 3:
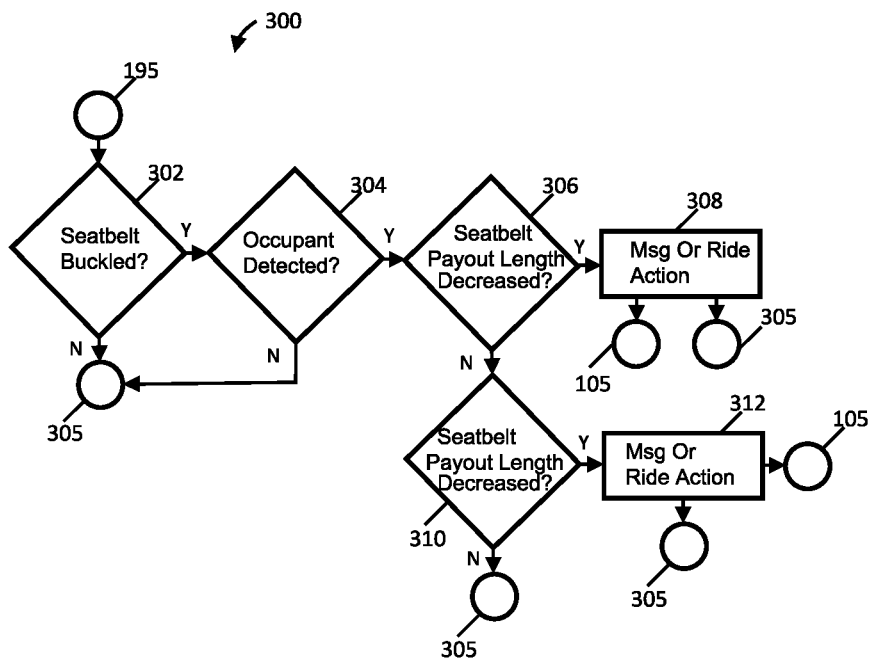
FIG. 3 is a flowchart illustrating a method for determining a seatbelt routing from a seatbelt retractor to a seatbelt buckle such as a shoulder belt portion of the seatbelt routed behind occupant, a shoulder belt portion of the seatbelt routed under shoulder of occupant, a shoulder belt portion of the seatbelt routed off a shoulder of occupant and an occupant that is twisted or turned in the seat, according to an exemplary embodiment.

Referring now to FIG. 3, a flowchart of a method 300 for detecting seatbelt routing is illustrated, in accordance with the present invention. More specifically, method 300 is configured to determine a plurality of seatbelt routing conditions such as a shoulder belt portion of the seatbelt routed behind occupant, a shoulder belt portion of the seatbelt routed under shoulder of occupant, a shoulder belt portion of the seatbelt routed off a shoulder of occupant and an occupant that is twisted or turned in the seat, for example. The method 300 starts at block 302 where a determination is made whether the seatbelt is buckled. If the seatbelt is determined to be buckled at block 302, then the method 300 continues at block 304 where a determination is made whether an occupant is detected in the vehicle seat. If at block 304, a determination is that an occupant is not present, then the method 300 continues to block 305 to the next routing detection method 400. If at block 304 the determination is made that an occupant is present in the vehicle seat, then the method 300 continues at block 306 where a determination is made whether the seatbelt payout length has decreased more than a first payout length decrease threshold as compared to the stored static length.

If at block 306, the seatbelt payout has decreased more than the first payout length decrease threshold as compared to the stored static length, then the method continues at block 308 where a message is provided to the vehicle occupants, a ride action is taken, or both. Messages can be visual, audible, haptic, or a combination of these. For example, the messages and ride actions taken are: a) instructing the occupant to wear the belt properly across the torso, b) instructing the occupant to unbuckle the seatbelt and buckle properly across the torso, c) instructing the occupant to sit in an erect position, d) preventing the ride from starting, e) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination thereof. After block 308, the method 300 returns to either block 105 or continues to block 305 to the next routing detection method 400. If a significant ride action is taken, the method 300 returns to block 105, otherwise, the method 300 continues to block 305 to the next routing detection method 400.

If at block 306, the seatbelt payout length has not decreased more than the first payout length decrease threshold from the stored static length, then the method 300 continues as follows. Method 300 can bypass blocks 310 and 312 and continue to block 305 to the next routing detection method 400. Alternatively, method 300 continues to block 310 where a determination is made whether the seatbelt payout length has decreased more than a second payout length decrease threshold that is a smaller length than the first payout length decrease threshold as compared to the stored static length. If the seatbelt payout length has not decreased more than the second payout length decrease threshold from the stored static length, then the method 300 moves from block 310 to next step 305 for the next routing detection method. If the seatbelt payout length has decreased more than the second payout length decrease threshold length as compare the stored static length, then at block 312 a message is provided to the vehicle occupants, a ride action is taken or both. Second payout length decrease threshold is less than first payout length decrease threshold, so the message and the ride action would be less severe. Messages can be visual, audible, haptic, or a combination thereof. For example, the messages and ride actions that are taken are: a) instructing the occupant to wear the belt properly across the torso, b) instructing the occupant to unbuckle the seatbelt and buckle properly across the torso, c) instructing the occupant to sit in an erect position, d) preventing the ride from starting, e) taking the vehicle and parking the vehicle in a local low risk location, f) contacting the home office that oversees the vehicle service to reset the system, view the interior environment to assess the situation or dialogue with the occupant and e) turning on a message icon, making a dinging sound, vibrating a seat or some combination of these. After block 312, the method can either return to block 105 or continue to block 305 to the next routing detection method 400. If a ride action is taken that is more than a warning, the method returns to block 105, otherwise, the method would continue to block 305 to the next routing detection method 400. The approach used could be a calibratable input or could be hard coded into the method 300.

Figure 4:
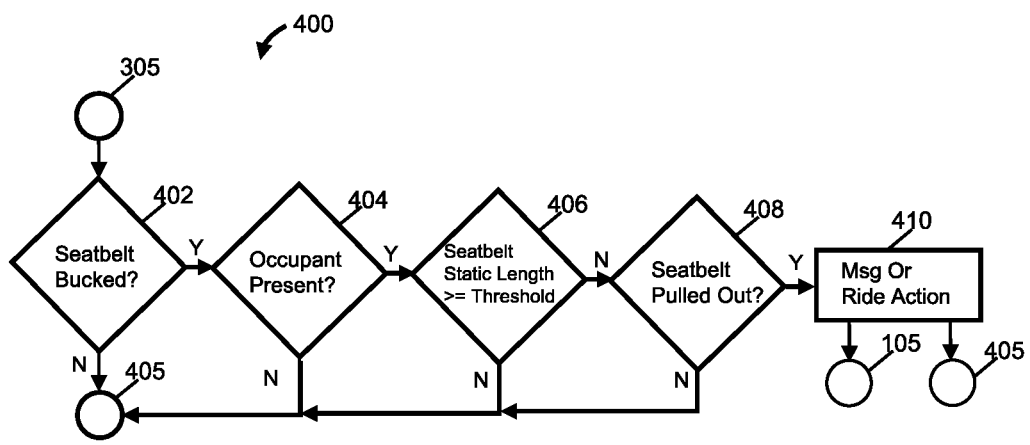
FIG. 4 is a flowchart illustrating a method for determining a seatbelt routing from a seatbelt retractor to a seatbelt buckle such as whether there is an object between the vehicle occupant and the seatbelt after the seatbelt is buckled, a shoulder belt portion of the seatbelt is routed under shoulder of occupant, a shoulder belt portion of the seatbelt routed off a shoulder of occupant, an occupant that is twisted or turned in the seat, a seatbelt is being held by occupant, a seatbelt is being held with a clip or routing assistant, and an occupant has routed the seatbelt around the knees, according to an exemplary embodiment.

Referring now to FIG. 4, a flowchart of a method 400 for detecting seatbelt routing is illustrated, in accordance with the present invention. More specifically, method 400 is configured to determine a plurality of seatbelt routing conditions such as whether there is an object between the vehicle occupant and the seatbelt after the seatbelt is buckled, a shoulder belt portion of the seatbelt is routed under shoulder of occupant, a shoulder belt portion of the seatbelt routed off a shoulder of occupant, an occupant that is twisted or turned in the seat, a seatbelt is being held by occupant, a seatbelt is being held with a clip or routing assistant, and an occupant has routed the seatbelt around the knees, for example. The method 400 starts at block 402 where a determination is made whether the seatbelt is buckled. If the seatbelt is determined to be buckled at block 402, then the method 400 continues at block 404 where a determination is made whether an occupant is detected in the vehicle seat. If at block 404 a determination is made that an occupant is present in the vehicle seat, then the method 400 continues at block 406 where a determination is made whether the seatbelt stored static length is greater than or equal to a first stored static length threshold. However, if at block 404 a determination is made that an occupant is not present in the vehicle seat, then the method 400 continues to block 405 to the next routing detection method 600. If at block 406 a determination is made that the seatbelt stored static length is greater than or equal to the first stored static length threshold, then the method 400 continues at block 408 where a determination is made whether the seatbelt payout length is at least more than a first pullout length threshold beyond the stored static length. However, if at block 406 a determination is made that the seatbelt stored static length is not more than or equal to the first stored static length threshold, then the method 400 continues to block 405 to the next routing detection method 600. If at block 408, a determination is made that the seatbelt has been pulled out so that seatbelt payout length is at least more than the first pullout threshold length beyond the stored static length, then the method 400 continues at block 410 where a message is provided to the vehicle occupants, a ride action is taken, or both are done. Messages can be visual, audible, haptic, or a combination of these. For example, the messages and ride actions that are taken are: a) instructing the occupant to wear the belt properly across the torso, b) instructing the occupant to unbuckle the seatbelt and buckle properly across the torso, c) instructing the occupant to sit in an erect position, d) preventing the ride from starting, e) taking the vehicle and parking it in a local low risk location, f) contacting the home office that oversees the vehicle service to reset the system, view the interior environment to assess the situation or dialogue with the occupant and g) turning on a message icon, making a dinging sound, vibrating a seat or some combination thereof. After block 410, the method 400 can either return to block 105 or to the block 405 to the next routing detection method 600. If a significant ride action is taken, the method 400 would return to block 105, otherwise, the method 400 would continue to block 405 to the next routing detection method 600. However, if at block 408 a determination is made that the seatbelt payout length is not at least more than the first pullout length threshold beyond the stored static length, then the method 400 continues to the next detection method 600.

Figure 5:
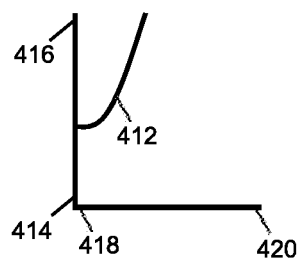
FIG. 5 is a chart showing a relationship between stored static length and the pullout length threshold beyond the stored static length, according to an exemplary embodiment.

The first pullout length threshold is a discrete value or a value that changes based on the stored static length. FIG. 5 shows an example of how the pullout length threshold 412 varies relative to the stored static length on one axis and the first pullout length threshold beyond stored static length on the other axis. The stored static length varies on the vertical axis from a small stored static length 414 to a large stored static length 416 and on the horizontal axis from a small pullout length threshold beyond stored static length 418 to a large pullout length threshold beyond stored static length 420. Pullout length threshold 412 may be defined to have different curve shapes.

Figure 6:
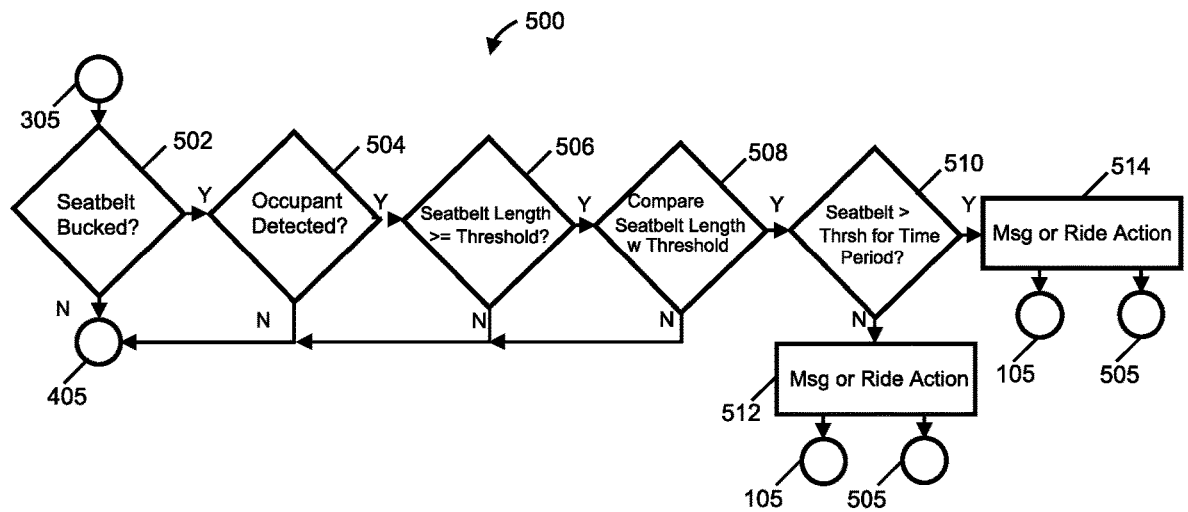
FIG. 6 is a flowchart illustrating an alternate method for determining a seatbelt routing from a seatbelt retractor to a seatbelt buckle such as whether there is an object between the vehicle occupant and the seatbelt after the seatbelt is buckled, a shoulder belt portion of the seatbelt is routed under shoulder of occupant, a shoulder belt portion of the seatbelt routed off a shoulder of occupant, an occupant that is twisted or turned in the seat, a seatbelt is being held by occupant, a seatbelt is being held with a clip or routing assistant, and an occupant has routed the seatbelt around the knees, according to an exemplary embodiment.

Referring now to FIG. 6, a flowchart of an alternate method 500 for detecting seatbelt routing is illustrated, in accordance with the present invention. More specifically, alternate method 500 is configured to determine the same seatbelt routing conditions as described above with respect to method 400, namely, whether there is an object between the vehicle occupant and the seatbelt after the seatbelt is buckled, a shoulder belt portion of the seatbelt is routed under shoulder of occupant, a shoulder belt portion of the seatbelt routed off a shoulder of occupant, an occupant that is twisted or turned in the seat, a seatbelt is being held by occupant, a seatbelt is being held with a clip or routing assistant, and an occupant has routed the seatbelt around the knees, for example. The method 500 starts at block 502 where a determination is made whether the seatbelt is buckled. If the seatbelt is determined to be buckled at block 502, then the method 500 continues at block 504 where a determination is made whether an occupant is detected in the vehicle seat. If at block 504 a determination is made that an occupant is present in the vehicle seat, then the method 500 continues at block 506 where a determination is made whether the seatbelt stored static length is more than or equal to a first stored static length threshold. However, if at block 504 a determination is made that an occupant is not present in the vehicle seat, then the method 500 continues to block 505 to next routing detection method. If at block 506, a determination is made that the seatbelt stored static length is more than or equal to the first stored static length threshold, then the method 500 continues at block 508 where a determination is made whether seatbelt payout length is between a second pullout threshold length beyond the stored static length and a third pullout threshold length beyond the stored static length. However, if at block 508 a determination is made that the seatbelt payout length is not between the second pullout length threshold beyond the stored static length and the third pullout length threshold beyond the stored static length, then the method 500 continues to the block 405 to the next routing detection method 600. If at block 508 a determination is made that the seatbelt payout is between the second pullout length threshold beyond the stored static length and the third pullout length threshold beyond the stored static length, then the method 500 continues at block 510 where a determination is made whether in a time window from the point in time when the stored static length is determined to the present time, the seatbelt was pulled out at least more than the first pullout length threshold beyond the stored static length. If at block 510, a determination is made that the seatbelt was pulled out in the past between the point in time when the stored static length was determined and the present time to a length that is at least more than the first pullout threshold length beyond the stored static length, then the method 500 continues at block 512 where a message is provided to the vehicle occupants, a ride action is taken or both are done. Messages can be visual, audible, haptic, or a combination of these. For example, the messages and ride actions taken are: a) instructing the occupant to wear the belt properly across the torso, b) instructing the occupant to unbuckle the seatbelt and buckle properly across the torso, c) instructing the occupant to sit in an erect position, d) preventing the ride from starting, e) taking the vehicle and parking the vehicle in a local low risk location, f) contacting the home office that oversees the vehicle service to reset the system, view the interior environment to assess the situation or dialogue with the occupant and g) turning on a message icon, making a dinging sound, vibrating a seat or some combination thereof. After block 512, the method 500 either returns to block 105 or continues to block 505 to the next routing detection method 600. If a ride action is taken that is more than a message, the method 500 would return to block 105, otherwise, continue to block 405 to the next routing detection method 600. The message or ride action may be more than a message to the occupant for block 512 as the occupant could have the seatbelt routed under the shoulder. The approach used is a calibratable input or is hard coded into the method 500.

If at block 510, a determination is made that the seatbelt was pulled out in the past between the point in time when the stored static length was determined and the present time to a length that is not more than the first pullout length threshold beyond the stored static length, then the method 500 continues at block 514 where a message is provided to the vehicle occupants, a ride action is taken or both are done. Messages can be visual, audible, haptic, or a combination of these. For example, the messages and ride actions taken are: a) instructing the occupant to wear the belt properly across the torso, b) instructing the occupant to unbuckle the seatbelt and buckle properly across the torso, c) instructing the occupant to sit in an erect position, d) preventing the ride from starting, e) taking the vehicle and parking the vehicle in a local low risk location, f) contacting the home office that oversees the vehicle service to reset the system, view the interior environment to assess the situation or dialogue with the occupant and g) turning on a message icon, making a dinging sound, vibrating a seat or some combination thereof. After block 514, the method 500 either returns to block 105 or continues to block 405 to the next routing detection method 600. If a ride action is taken that is more than a message, the method 500 would return to block 105, otherwise, continue to block 405 to the next routing detection method 600. The approach used is a calibratable input or is hard coded into the method 500. The first pullout length threshold, the second pullout length threshold and the third pullout length threshold are discrete values or values that change based on the stored static length, as illustrated in FIG. 5.

Figure 7:
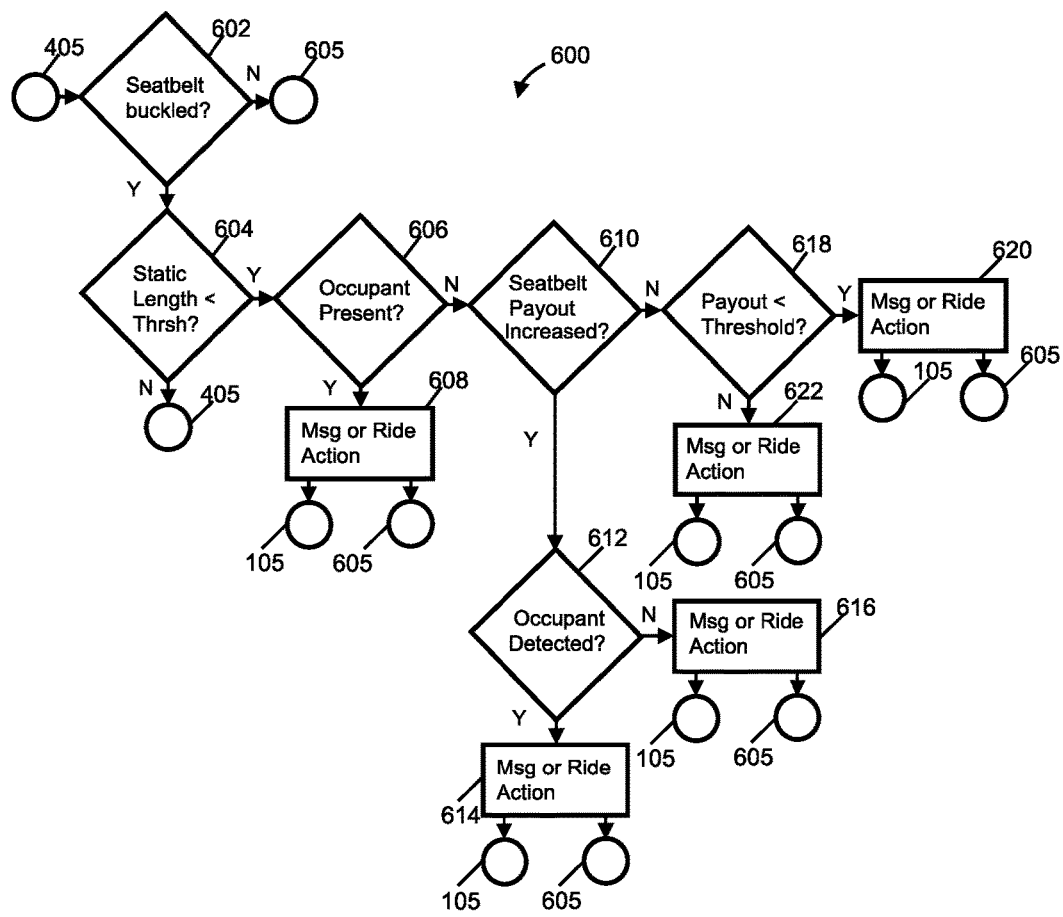
FIG. 7 is a flowchart illustrating a method for determining a seatbelt routing from a seatbelt retractor to a seatbelt buckle such as the seatbelt is routed behind the seat or wrapped around the head restraint, a fake latch plate is present in the seatbelt buckle, seatbelt latch plate is present in the wrong buckle, the lap belt portion of the seatbelt is not worn, seatbelt is routed behind occupant and buckled, a buckled unused seatbelt and a seat belted object, according to an exemplary embodiment.

Referring now to FIG. 7, a flowchart of a method 600 for detecting seatbelt routing is illustrated, in accordance with the present invention. More specifically, method 600 is configured to determine a plurality of seatbelt routing conditions such as the seatbelt is routed behind the seat or wrapped around the head restraint, a fake latch plate is present in the seatbelt buckle, seatbelt latch plate is present in the wrong buckle, the lap belt portion of the seatbelt is not worn, seatbelt is routed behind occupant and buckled, a buckled unused seatbelt and a seat belted object, for example. The method 600 starts at block 602 where a determination is made whether the seatbelt is buckled. If at block 602 the seatbelt is determined to not be buckled, then the method 600 continues to block 605 to the next routing detection method 700. If at block 602 the seatbelt is determined to be buckled, then the method 600 continues to block 604 where a determination is made whether seatbelt stored static length is less than a second stored static length threshold. If seatbelt stored static length is less than the second stored static length threshold, then the method 600 continues at block 606 where a determination is made whether an occupant is present in the vehicle seat. However, if at block 604 a determination is made that seatbelt stored static length is not less than the second stored static length threshold, then the method 600 continues to block 605 to the next routing detection method 700. If an occupant is present in the vehicle seat, then the method 600 continues from block 606 to block 608 where one or both of a message is provided to the vehicle occupants and a ride action is taken. Messages can be visual, audible, haptic, or a combination of these. For example, the messages and ride actions taken are: a) instructing the occupant to buckle, b) instructing the occupant to buckle in the object on the seat, c) instructing the occupant to move the object in the seat to a more suitable cargo storage location, d) preventing the ride from starting, e) taking the vehicle and parking it in a local low risk location, f) contacting the home office that oversees the vehicle service to reset the system, view the interior environment to assess the situation or dialogue with the occupant and g) turning on a message icon, making a dinging sound, vibrating a seat or some combination thereof. After block 608, the method 600 returns to block 105 or continues to block 605 to the next routing detection method 700. The approach used is a calibratable input or is hard coded into the method 600.

If at block 606 an occupant is not present in the vehicle seat, then the method 600 continues at block 610 where a determination is made whether the seatbelt payout has increased by more than a second payout length threshold beyond the stored static length while remaining buckled. The second payout length threshold is greater than the first payout length threshold. If the seatbelt payout length has increased by more than second payout length threshold while remaining buckled, then the method 600 continues at block 612 where a determination is made whether the occupant has been detected in the vehicle seat while seatbelt payout length is increasing and after seatbelt payout length has increased. If the occupant has been detected in the vehicle seat while seatbelt payout length is increasing or after seatbelt payout length has increased, then the method 600 continues at block 614 where one or both of a message is provided to the vehicle occupants and a ride action is taken. Messages can be visual, audible, haptic, or a combination of these. For examples, messages and ride actions taken are: a) instructing the occupant to unbuckle and re-buckle properly, b) instructing the occupant to move the object in the seat to a more suitable cargo storage location, c) preventing the ride from starting, d) taking the vehicle and parking the vehicle in a local low risk location, e) contacting the home office that oversees the vehicle service to reset the system, view the interior environment to assess the situation or dialogue with the occupant and f) turning on a message icon, making a dinging sound, vibrating a seat or some combination of these. After block 614, the method returns to block 105 or continues to block 605 to the next routing detection method 700. The approach used is a calibratable input or is hard coded into the method 600.

However, if at block 612 the occupant has not been detected in the vehicle seat after seatbelt payout length has increased, then the method 600 continues to block 616 where the ride is allowed to: a) proceed, and/or a message is provided to the vehicle occupants; b) a message is provided, and a ride action is taken. Messages can be visual, audible, haptic, or a combination thereof. For example, the messages and ride actions taken are: a) instructing the occupant to move the object in the seat to a more suitable cargo storage location, b) preventing the ride from starting, c) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination thereof. After block 616, the method returns to block 105 or continues to block 605 to the next routing detection method 700. The approach used is a calibratable input or is hard coded into the method 600.

If the seatbelt payout length has not increased by more than the second payout length threshold while remaining buckled at block 610, then the method 600 continues at block 618 where a determination is made whether seatbelt payout length is less than a third payout length threshold. The third payout length threshold is smaller than first payout length threshold. If at block 618, the seatbelt payout length is less than the third payout length threshold, then the method 600 continues at block 620 where one or both of a message is provided to the vehicle occupants, a ride action is taken. Messages can be visual, audible, haptic, or a combination thereof. For example, the messages and ride actions taken are: a) instructing the adjacent occupant to buckle into the correct buckle, b) preventing the ride from starting, c) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination thereof. After block 620, the method returns to block 105 or continues to block 605 to the next routing detection method 700. The approach used is a calibratable input or is hard coded into the method 600.

However, if at block 618 the seatbelt payout length is not less than the third payout length threshold, then the method 600 continues to block 622 where one or both of the ride is allowed to proceed and a) a message is provided to the vehicle occupants or b) a message and a ride action is taken. Messages can be visual, audible, haptic, or a combination of these. For example, the messages and ride actions taken are: a) instructing any occupant to unbuckle the seatbelt, b) preventing the ride from starting, c) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination thereof. After block 622, the method 600 returns to block 105 or continues to block 605 to the next routing detection method 700. The approach used is a calibratable input or is hard coded into the method 600.

Figure 8:
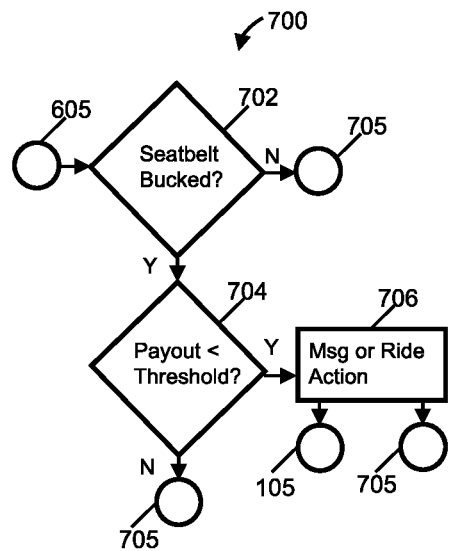
FIG. 8 is a flowchart illustrating a method for determining a seatbelt routing from a seatbelt retractor to a seatbelt buckle whether the seatbelt is routed behind the seat or wrapped around the head restraint, a fake latch plate is present in the seatbelt buckle, seatbelt latch plate is present in the wrong buckle, the lap belt portion of the seatbelt is not worn, the shoulder belt portion of the seatbelt is not worn, the seatbelt is routed behind occupant and buckled, a buckled unused seatbelt and a seat belted object, according to an exemplary embodiment.

Referring now to FIG. 8, a flowchart of an alternate method 700 for detecting seatbelt routing is illustrated, in accordance with the present invention. More specifically, alternate method 700 is configured to determine the same seatbelt routing conditions as described above with respect to method 600, namely, whether the seatbelt is routed behind the seat or wrapped around the head restraint, a fake latch plate is present in the seatbelt buckle, seatbelt latch plate is present in the wrong buckle, the lap belt portion of the seatbelt is not worn, the shoulder belt portion of the seatbelt is not worn, the seatbelt is routed behind occupant and buckled, a buckled unused seatbelt and a seatbelted object, for example. The method 700 starts at block 702 where a determination is made whether the seatbelt is buckled. If the seatbelt is determined to not be buckled at block 702, then the method 700 continues to block 705 to the next routing detection method. If the seatbelt is determined to be buckled at block 702, then the method 700 continues at block 704 where a determination is made whether the seatbelt payout length is less than a fourth payout length threshold. If at block 704, a determination is made that the seatbelt payout is less than the fourth payout length threshold, then the method 700 continues at block 706 where one or both of a message is provided to the vehicle occupants and a ride action is taken. Messages can be visual, audible, haptic, or a combination of these. For example, the messages and ride actions taken are: a) instructing the occupant to unbuckle and re-buckle properly, b) instructing the occupant to move the object in the seat to a more suitable cargo storage location, c) preventing the ride from starting, d) taking the vehicle and parking the vehicle in a local low risk location, e) contacting the home office that oversees the vehicle service to reset the system, view the interior environment to assess the situation or dialogue with the occupant and f) turning on a message icon, making a dinging sound, vibrating a seat or some combination thereof. After block 706, the method returns to block 105 or continues to block 705 for the next routing detection method 800. The approach used is a calibratable input or is hard coded into the method 700. However, if at block 704 a determination is made that the seatbelt payout is not less than the fourth payout length threshold, then the method 700 continues to the block 705 to the next routing detection method 800.

Figure 9:
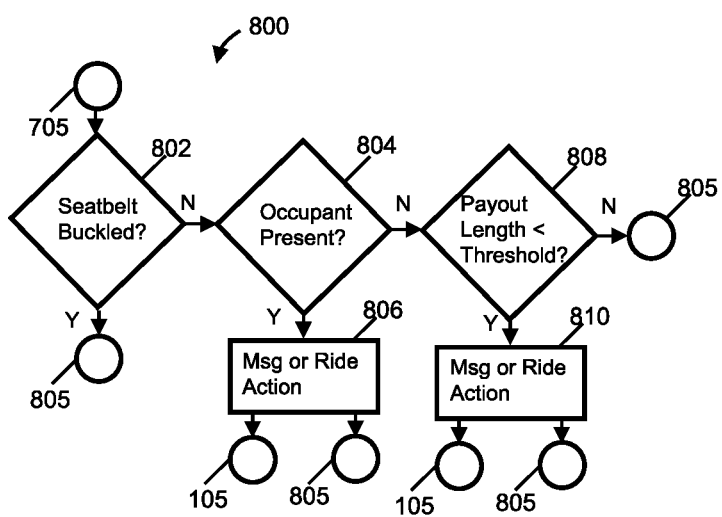
FIG. 9 is a flowchart illustrating a method for determining a seatbelt routing from a seatbelt retractor to a seatbelt buckle such as the seatbelt is non-retracting, an unbelted occupant, seatbelt entrapment, and the seatbelt latchplate is buckled into wrong buckle, according to an exemplary embodiment.

Referring now to FIG. 9, a flowchart of a method 800 for detecting seatbelt routing is illustrated, in accordance with the present invention. More specifically, method 800 is configured to determine a plurality of seatbelt routing conditions such as the seatbelt is non-retracting, an unbelted occupant, seatbelt entrapment, and the seatbelt latchplate is buckled into wrong buckle, for example. The method 800 starts at block 802 where a determination is made whether the seatbelt is buckled. If the seatbelt is determined to be buckled at block 802, then the method 800 continues to block 805 to the next routing detection method 900. If at block 802, the seatbelt is not buckled, then the method 800 continues at block 804 where a determination is made whether an occupant is present in the vehicle seat. If at block 804 an occupant is present in the vehicle seat, then the method 800 continues at block 806 where one of or both a message is provided to the vehicle occupants and a ride action is taken. Messages can be visual, audible, haptic, or a combination of these. Some examples messages and ride actions taken are: a) instructing the occupant to unbuckle and re-buckle properly, b) preventing the ride from starting, c) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination thereof. After block 806, the method returns to block 105 or continues to block 805 to the next routing detection method 900. The approach used is a calibratable input or is hard coded into the method 800.

However, if at block 804 a determination is made that an occupant is not present in the vehicle seat, then the method 800 continues at block 808 where a determination is made whether seatbelt payout is more than a fifth payout length threshold. If seatbelt payout length is more than the fifth payout length threshold, then the method 800 continues at block 810 where one of or both a message is provided to the vehicle occupants and a ride action is taken. Messages can be visual, audible, haptic, or a combination thereof. For example, the messages and ride actions taken are: a) instructing the occupant to retract the seatbelt properly, b) preventing the ride from starting, c) taking the vehicle and parking the vehicle in a local low risk location, d) contacting the home office that oversees the vehicle service to reset the system, view the interior environment to assess the situation or dialogue with the occupant and e) turning on a message icon, making a dinging sound, vibrating a seat or some combination thereof. After block 810, the method returns to block 105 or continues to block 805 to the next routing detection method 900. The choice of these outcomes may be programmed into the method directly or as a calibratable feature. However, if at block 808 the seatbelt payout length is not more than the fifth payout length threshold, then the method 800 continues to the block 805 to the next routing detection method 900.

Referring now to FIG. 10, a flowchart of a method 900 for detecting seatbelt routing is illustrated, in accordance with the present invention. More specifically, method 900 is configured to determine a plurality of seatbelt routing conditions such as whether the shoulder belt portion of the seatbelt is routed behind the back of the occupant, for example. The method 900 starts at block 902 where a determination is made whether the seatbelt is buckled. If the seatbelt is determined to not be buckled at block 902, then the method 900 continues to block 905 to the next routing detection method 1000. If at block 902, the seatbelt is determined to be buckled, then the method 900 continues to block 906 where a determination is made whether an occupant is present in the vehicle seat. If at block 906 an occupant is not present in the vehicle seat, then the method 900 continues to block 905 to the next seatbelt routing detection method 1000. However, if at block 906 an occupant is present in the vehicle seat, then the method 900 continues at block 908 where a determination is made whether the seatbelt payout is between a sixth payout length threshold and a seventh payout length threshold. If at block 908 a determination is made that the seatbelt payout length is not between the sixth payout length threshold and the seventh payout length threshold, then the method 900 continues to block 905. However, if at block 908 a determination is made that the seatbelt payout length is between the sixth payout length threshold and the seventh payout length threshold, then the method 900 continues to block 910 where a determination is made for whether one or more of the following six conditions exists: (a) the seatbelt payout length is greater than an eighth payout length threshold, (b) the seatbelt payout rate decreases greater than a payout rate threshold, (c) the seatbelt payout length is between a ninth payout length threshold and a tenth payout length threshold that are both smaller than the stored static length, or any combination of the above. The approach used is a calibratable input or is a hard coded into the method 900. If at block 910 a determination is made that one of the above identified six conditions does not exist then the method 900 continues to block 905. However, if at block 910 a determination is made that one of the above identified six conditions does exist, then the method 900 continues to block 912. At block 912 a message is provided to the vehicle occupants, a ride action is taken or both are provided. Messages are visual, audible, haptic, or a combination of these. Examples of messages and ride actions that are taken are: a) instructing the occupant to unbuckle and re-buckle properly, b) instructing the occupant to properly route the seatbelt, c) preventing the ride from starting, d) taking the vehicle and parking it in a local low risk location, e) contacting the home office that oversees the vehicle service to reset the system, view the interior environment to assess the situation or dialogue with the occupant and f) turning on a warning icon, making a dinging sound, vibrating a seat or some combination of these. After block 912, the method returns to block 105 or continues to block 905 to the next routing detection method 1000. The approach used is a calibratable input or could be hard coded into the method 900.

Figure 11:
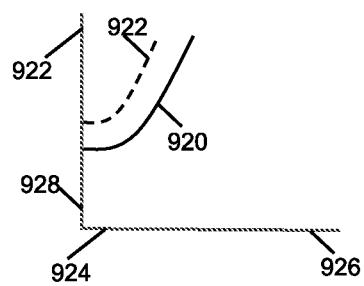
FIG. 11 is a chart showing how the payout length threshold varies relative to the initial payout length, according to an exemplary embodiment.

The eighth payout length threshold, ninth payout length threshold, and tenth payout length threshold are discrete values or are values that change based on the additional payout length. Likewise, other payout length thresholds herein may be modified based on the additional payout length. FIG. 11 shows an example of how the payout length threshold 920 varies relative to the initial payout length on the vertical axis 922 and the additional payout length on the horizontal axis 923. On the horizontal axis 923 the additional seatbelt payout length varies from a small additional seatbelt payout length 924 to a large additional seatbelt payout length 926. On the vertical axis 922 the initial seatbelt payout length varies from a small initial seatbelt payout length 928 to a large initial seatbelt payout length 930. Payout length threshold 920 may be defined to have different curve shapes and an upper threshold limit 932 defining a payout length threshold range between payout length threshold 920 and upper threshold limit 932.

Figure 12:
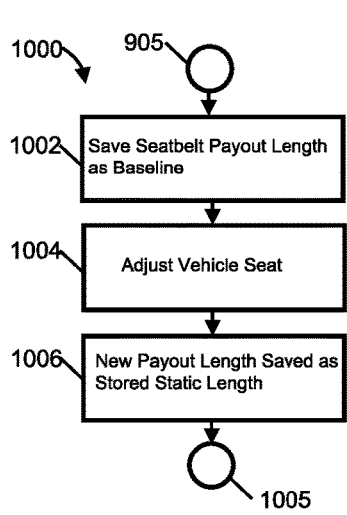
FIG. 12 is a flow chart illustrating a method for determining a seatbelt payout length and adjusting thresholds after an occupant has moved the vehicle seat, according to an exemplary embodiment.

Referring now to FIG. 12, a flowchart of a method 1000 for determining a seatbelt payout length and adjusting any of the above identified thresholds after an occupant has moved the vehicle seat. Method 1000 is initiated at block 1002 where the seatbelt payout length is saved as a baseline seatbelt payout length. The seatbelt payout length saved could be the previously saved stored static length or the seatbelt payout length at the time of seat movement. The choice is a calibratable input or hard coded into the method. At block 1004, the vehicle seat is adjusted by the occupant. Method 1000 continues from block 1004 to block 1006, where a new seatbelt payout length is saved as the stored static length and any of the above identified thresholds are saved after seat travel has stopped. After block 1006, method 1000 proceeds to block 1005 to the next routing detection method.

Figure 13:
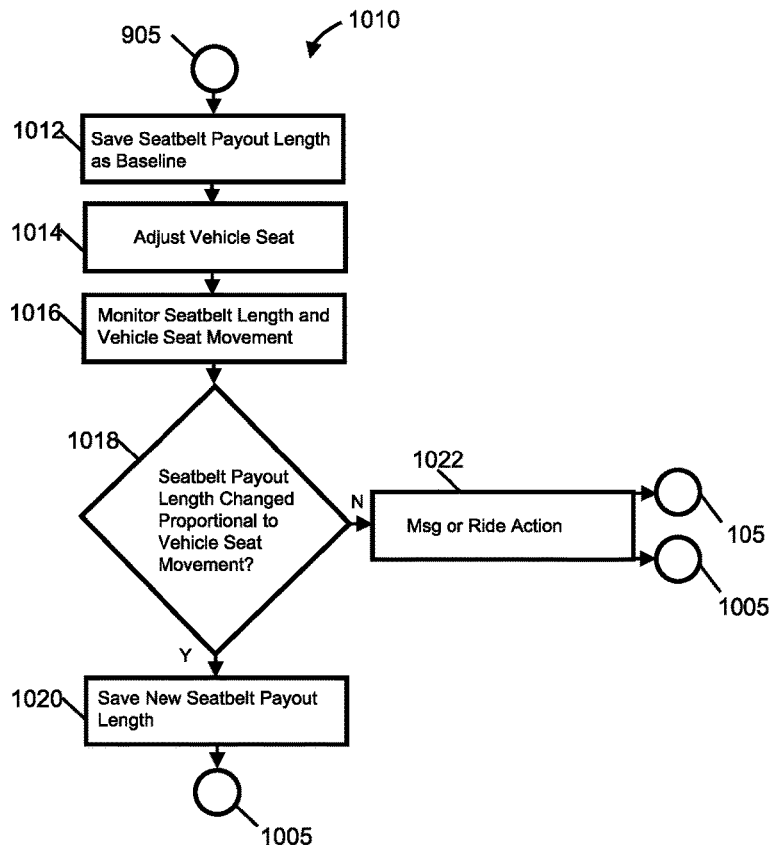
FIG. 13 is a flow chart illustrating an alternate method for determining a seatbelt payout length and adjusting thresholds after an occupant has moved the vehicle seat, according to an exemplary embodiment.

Referring now to FIG. 13, a flowchart illustrating an alternate method 1010 for determining a new seatbelt payout length and adjusting any of the above identified thresholds after an occupant has moved the vehicle seat. Method 1010 is initiated at block 1012 where the seatbelt payout length is saved as a baseline seatbelt payout length. The payout length saved could be the previously saved stored static length or the seatbelt payout length at the time of seat movement. The choice is a calibratable input or hard coded into the method. At block 1014, the vehicle seat is adjusted by the occupant. At block 1016, the seatbelt payout length and vehicle seat movement are monitored. At block 1018, a determination is made whether the seatbelt payout length changed proportional to the vehicle seat movement. If at block 1018, a determination is made that the seatbelt payout length changed proportional to the vehicle seat movement, then the method 1010 continues from block 1018 to block 1020 where a new seatbelt payout length is saved as the stored static length and any of the above identified thresholds are adjusted and saved after seat travel has stopped. After block 1020, method 1000 proceeds to block 1005 to the next routing detection method 1040. However, if at block 1018, a determination is made that the seatbelt payout length change is not proportional to the vehicle seat movement, then the method 1010 continues from block 1018 to block 1022 where a message is provided to the vehicle occupants, a ride action is taken, or both are provided. Messages can be visual, audible, haptic, or a combination of thereof. Examples of messages and ride actions taken are: a) instructing the occupant to unbuckle and re-buckle properly, b) instructing the occupant to readjust the seat, c) preventing the ride from starting, d) taking the vehicle and parking the vehicle in a local low risk location, e) contacting the home office that oversees the vehicle service to reset the system, view the interior environment to assess the situation or dialogue with the occupant and g) turning on a message icon, making a dinging sound, vibrating a seat or some combination of these. After block 1022 the method 1010 returns to block 105 or continues to block 1005 to the next routing method 1040.

With reference to FIG. 14, a chart of the range of acceptable seatbelt payout lengths is shown for a given seat movement in order to confirm that the measured seatbelt payout length is correct. An example of how the seatbelt payout length 1030 varies within an acceptable range 1032 relative to the saved payout length on the vertical axis 1034 and the seat movement on the horizontal axis 1035. On the horizontal axis the seat movement varies from a from a more reclined or more vertical, more rear, either lower or higher seat position 1036 to a more reclined or more vertical, more forward, either lower or higher seat position 1038. On the vertical axis 1034 the seatbelt payout length varies from a small seatbelt payout length 1040 to a large seatbelt payout length 1042. For example, seat movement includes: vertical movement, fore-aft movement, a seat bottom rotation movement, a seat back rotation movement, a seat bottom extension movement, a lumbar extension movement. Alternatively, more than one seat movement may be represented on one axis as a compiled seat movement of several individual movements. The perimeter of the acceptable range 1032 defines a seat difference threshold. Acceptable range 1032 of seatbelt payout length may be defined to have different shapes and location in FIG. 14.

Figure 15:
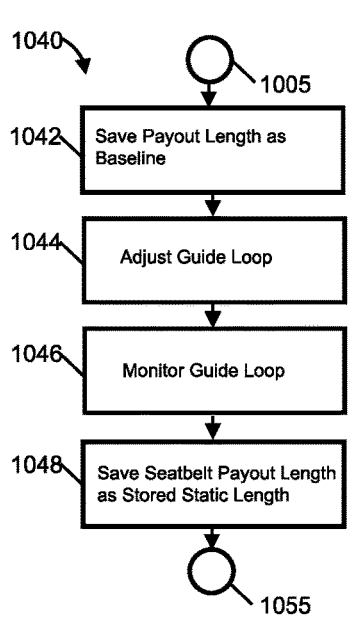
FIG. 15 is a flow chart illustrating a method for determining a seatbelt payout length and adjusted thresholds after an occupant has moved the guide loop, according to an exemplary embodiment.

Referring now to FIG. 15, a flowchart of a method 1040 for determining a seatbelt payout length and adjusted thresholds after an occupant has moved the guide loop. Method 1040 is initiated at block 1042 where the seatbelt payout length is saved as a baseline length. The saved seatbelt payout length is the previously saved stored static seatbelt length or the seatbelt payout length at the time of guide loop movement. The choice is a calibratable input or hard coded into the method. At block 1044, the guide loop is adjusted by the occupant. At block 1046, guide loop movement is monitored. Method 1040 continues from block 1046 to block 1048, where the seatbelt payout length is saved as the stored static length and thresholds are saved after guide loop travel has stopped. After block 1048, method 1040 proceeds to block 1055 to the next routing detection method 1050.

Figure 16:
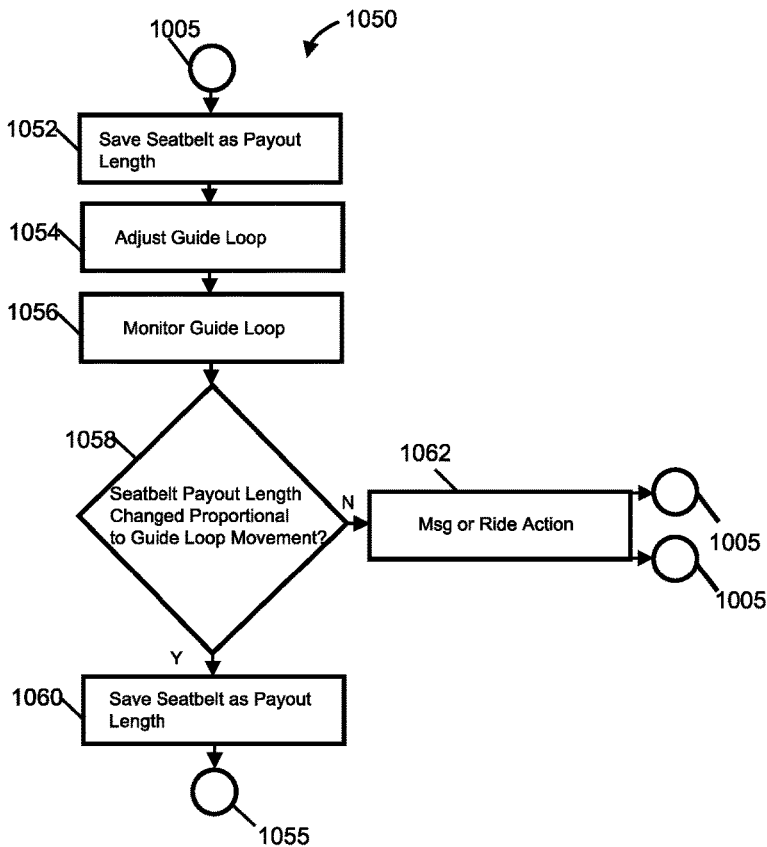
FIG. 16 is a flow chart illustrating an alternate method for determining a seatbelt payout and adjusted thresholds after an occupant has moved the guide loop, according to an exemplary embodiment.

Referring now to FIG. 16, a flowchart of an alternate method 1050 for determining a seatbelt payout length and adjusted thresholds after an occupant has moved the guide loop. Method 1050 is initiated at block 1052 where the seatbelt payout length is saved as a baseline length. The payout length saved is the previously saved stored static length or the seatbelt payout length at the time of seat movement. The choice is a calibratable input or hard coded into the method. At block 1054, the guide loop is adjusted by the occupant. At block 1056, the seatbelt payout length and guide loop movement are monitored. At block 1058, a determination is made whether the seatbelt payout length changed proportional to the guide loop movement. If at block 1058, a determination is made that the seatbelt payout length has changed proportional to the guide loop movement, then the method 1050 continues from block 1058 to block 1060 where the seatbelt payout length is saved as the stored static length and thresholds are saved after guide loop travel has stopped. After block 1060, method 1050 proceeds to block 1055 to the next routing detection method. However, if at block 1058, a determination is made that the seatbelt payout length change is not proportional to the guide loop movement, then the method 1050 continues from block 1058 to block 1062 where a message is provided to the vehicle occupants, a ride action is taken, or both are provided. Messages can be visual, audible, haptic, or a combination of thereof. Examples of messages and ride actions taken are: a) instructing the occupant to unbuckle and re-buckle properly, b) instructing the occupant to readjust the guide loop, c) preventing the ride from starting, d) taking the vehicle and parking the vehicle in a local low risk location, e) contacting the home office that oversees the vehicle service to reset the system, view the interior environment to assess the situation or dialogue with the occupant and g) turning on a message icon, making a dinging sound, vibrating a seat or some combination of these. After block 1062 the method 1050 returns to block 105 or continues to block 1055 to the next routing detection method.

With reference to FIG. 17, a graph illustrating the range of acceptable seatbelt payout lengths is shown for a given guide loop movement in order to confirm that the measured payout length is correct. An example of how the seatbelt payout length 1070 varies within an acceptable range 1072 relative to the payout length saved on the vertical axis 1073 and the guide loop movement on the horizontal axis 1074. The perimeter of the acceptable range 1072 defines a guide loop difference threshold. Acceptable range 1072 of seatbelt payout length may be defined to have different shapes and location. The guide loop movement varies from a lower guide loop position 1076 to a higher guide loop position 1078. The seatbelt payout length varies from a lesser payout length 1080 to a greater payout length 1082.

Figure 18:
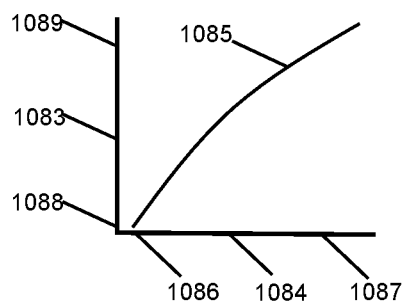
FIG. 18 is a diagram showing a relationship between seatbelt payout velocity and time, according to an exemplary embodiment.

With reference to FIG. 18, a graph illustrating how threshold adjustment varies with seat movement. An example of how a threshold on the vertical axis 1083 varies relative to the seat movement on the horizontal axis 1084 is shown and defined by line 1085. The seat movement varies on the horizontal axis 1084 from a more reclined or more vertical, more rear, either lower or higher seat position 1086 to a more reclined or more vertical, more forward, either lower or higher seat position 1087. The threshold adjustment varies on the vertical axis 1083 from a less adjustment 1088 to a more adjustment 1089. Each potential approach to moving the seat could be individually on the seat movement axis 1084, such as vertical movement, fore-aft movement, a seat bottom rotation movement, a seat back rotation movement, a seat bottom extension movement, a lumbar extension movement. Alternatively, more than one seat movement can be represented on the horizontal axis 1084 as a compiled seat movement of several individual movements. Any of the above identified thresholds can be adjusted using the FIG. 18.

Figure 19:
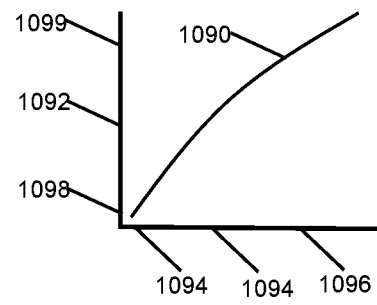
FIG. 19 is a chart illustrating how thresholds are adjusted based on guide loop movement, according to an exemplary embodiment.

With reference to FIG. 19, a graph illustrating how thresholds are adjusted based on guide loop movement. An example of how a threshold on the vertical axis 1092 varies relative to the guide loop movement on the horizontal axis 1094 is shown and defined by line 1090. One or more thresholds may be adjusted according to line 1090 or an alternate shaped curve for each threshold. The guide loop movement varies on the horizontal axis from a lower position 1094 to a higher position 1096. The threshold adjustment varies on the vertical axis from a less adjustment 1098 to a more adjustment 1099.

Figure 20:
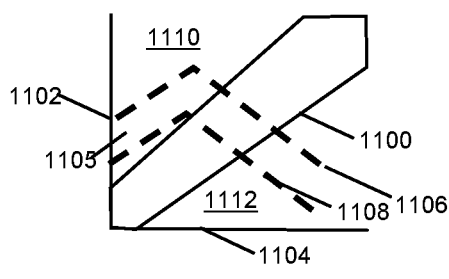
FIG. 20 is a chart illustrating a payout corridor that defines an acceptable payout length or distance threshold relative to seatbelt payout length or stored static length, according to an exemplary embodiment.
Figure 21:
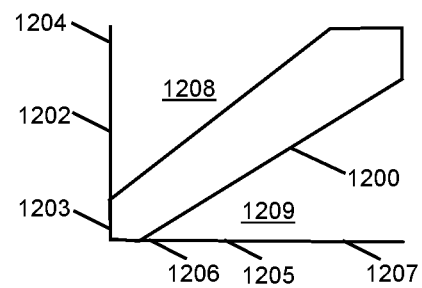
FIG. 21 is a chart illustrating a velocity corridor defining an acceptable payout velocity threshold relative to a stationary non-moving seatbelt, according to an exemplary embodiment.
Figure 22:
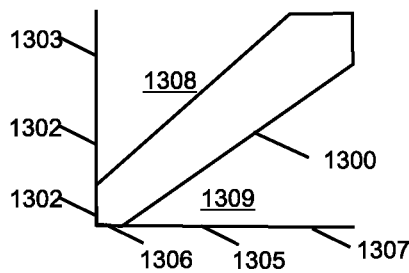
FIG. 22 is a chart illustrating an acceleration corridor defining an acceptable payout acceleration threshold relative to a stationary non-moving seatbelt, according to an exemplary embodiment.

Referring now to FIGS. 20, 21, and 22 graphs illustrating alternate seatbelt payout time based threshold definitions. These threshold determination approaches can be substituted singly or in a combined manner for the calibratable or hard coded payout length or distance-based thresholds in the methods described herein. For example, FIG. 20 shows a payout corridor 1100 that defines an acceptable payout length or distance threshold relative to current seatbelt payout length or stored static length on vertical axis 1102 and time on the horizontal axis 1104. Time can be measured from a) the time that the seatbelt has been pulled from its stowed condition, or b) the time that the seatbelt length has changed from the stored static length.

Corridors referenced with respect to FIGS. 20, 21, and 22 may be defined to match characteristic patterns of a response that is being assessed for a specific evaluation. As an example, a payout corridor to match taking a properly routed seatbelt, pulling it out, lifting it over one's head and dropping the shoulder belt behind the torso would have a seatbelt payout time history where the length would increase as the belt is being pulled out to allow it to pass over the occupant's head and it would decrease later in time as it was released on the back side of the occupant's head and the seatbelt webbing retracted into the seatbelt retractor so that the shoulder belt was behind the occupant. For this example an inverted V shaped corridor or zone 1105 is defined as shown in FIG. 20 by lines 1106–1108. Thus, zone 1105 could be substituted for discrete length or distance threshold or a range of values that form a threshold. Corridors 1100 and 1105 can have different shapes. Corridors 1100 and 1108 could have different areas alternatively be a line. The method may determine if a measured parameter is within a corridor 1100, crosses a corridor 1100 boundary to enter either a zone above 1110 or a zone below 1112.

Likewise, payout velocity can be used, as shown in FIG. 21, where velocity corridor 1200 defines an acceptable payout velocity threshold relative to a stationary non-moving seatbelt on vertical axis 1202 from a low velocity 1203 to a higher velocity 1204 and time on the horizontal axis 1205 from a less time 1206 to a longer time 1207. The algorithm or method may determine if a measured parameter is within a corridor 1200, crosses a corridor 1200 boundary to enter either a zone above 1208 or a zone below 1209. Corridor 1200 may have a different shape. Corridor 1200 could have different areas or alternatively be a line.

Payout acceleration may be used, as shown in FIG. 22 where acceleration corridor 1300 defines an acceptable payout acceleration threshold relative to a stationary non-moving seatbelt on vertical axis 1302 from a low acceleration 1033 to a higher acceleration 1304 and time on the horizontal axis 1305 from a less time 1306 to a longer time 1307. The algorithm may determine if a measured parameter is with the corridor 1300, crosses the corridor 1300 boundary to enter either a zone above 1308 or a zone below 1309. Corridor 1300 can have a different shape. Corridor 1300 could have different areas or alternatively be a line. In an embodiment of the present disclosure various combinations of a payout length or distance corridor 1105, a payout velocity corridor 1200, and a payout acceleration corridor 1300 may be used to define a threshold.

Figure 23:
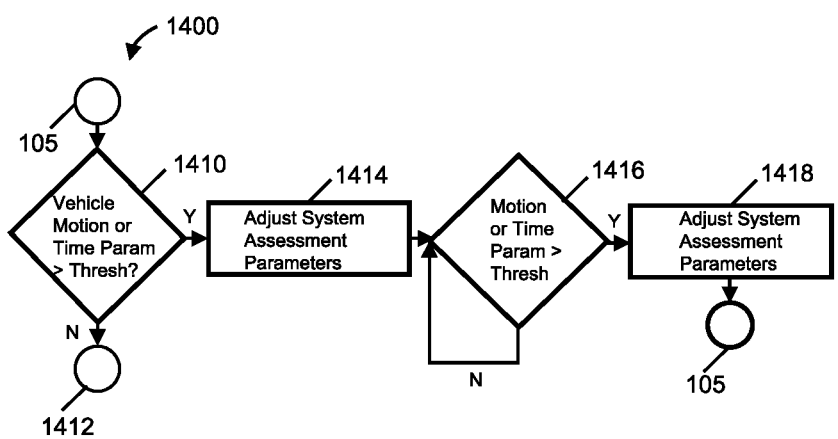
FIG. 23 is a flow chart illustrating a method for modifying the thresholds, messages, or ride actions based on time or vehicle motion, according to an exemplary embodiment.

Referring to FIG. 23, a method 1400 is illustrated in flowchart form for modifying the thresholds, messages, or ride actions based on time or vehicle motion. Method 1400 is initiated at block 1410 where a determination is made whether a vehicle motion or time-based parameter has exceeded a limit threshold. Examples of the vehicle motion or time-based parameters which could be used in this assessment are: time vehicle was stationary, time vehicle is moving, and a vehicle velocity is reached. If at block 1410 the method 1400 determines that a vehicle motion or time-based parameter has not exceeded a limit threshold, then the method 1400 continues at block 1412 to the next routing method. However, if at block 1410 the method 1400 determines that a vehicle motion or time-based parameter has exceeded a first time limit threshold, then the method continues at block 1414. At block 1414, the system assessment parameters are adjusted to one or more new values. Examples of possible adjustments would be to: turn off messages, turn off actions taken, adjusting thresholds to be more sensitive, adjusting thresholds to be less sensitive, turning off all or portions of some subroutines or methods, changing to more or less aggressive messages, changing to more or less aggressive ride actions taken. Continuing from block 1414, the method 1400 determines at block 1416 whether a vehicle motion or time-based parameter has exceeded a second time limit threshold. Examples of the vehicle motion or time-based parameters which could be used in this assessment are: time vehicle was stationary, time vehicle is moving, and a vehicle velocity is reached. If at block 1416, the method 1400 determines that a vehicle motion or time-based parameter has not exceeded a second time limit threshold, then the method 1400 continues to monitor whether a vehicle motion or time-based parameter has exceeded a second time limit threshold. However, if at block 1416 a vehicle motion or time-based parameter has exceeded a second time limit threshold, then the method 1400 continues to block 1418 where an adjustment to the system assessment parameters and to one or more past values is made. After block 1418 the method 1400 continues to the next routing method.

There are several variations which are possible within the scope of this disclosure. Static payout length could be calculated numerous ways. For example, the actual payout length or distance value is when the seatbelt is buckled, or the average payout value over a time threshold during and after the time of seatbelt buckling, or the minimum payout length or distance value over a time threshold during and after the time of seatbelt buckling (to account for an occupant leaning forward or twisting while buckling), or the average or minimum payout length or distance value between a first time threshold and a second time threshold after buckling, or the minimum payout value before the seatbelt payout increases (or increases beyond a threshold), or limited to within a time threshold window after buckling.

Any of the above referenced thresholds can be programmed into the algorithms or methods directly or as a calibratable feature that can be input as an entry to the base algorithms. Many of the cited thresholds can be discrete values or values that are adjustable, as shown in FIG. 3C. Also, the algorithms can be repeated with a different threshold where more severe warnings and ride actions are taken with larger thresholds and less severe warnings and ride actions are taken with smaller thresholds. The algorithm or method order can also be switched, and two or more algorithms can run concurrently.

Seat belt webbing payout sensor(s) 26, buckle sensor(s) 22, occupancy sensor(s) 24, can use instantaneously detected values or can use values sampled over a time period. The sampling time period could be varied by sensor type or the condition (i.e. a) vehicle stationary vs vehicle moving, b) ride not started vs ride started, and c) sensor response in to the method not changed vs sensor response into the method changed).

In addition, the method described herein can cycle back and forth between decision boxes as samples are taken and processed, and decisions become more statistically accurate. The method can run continuously or can run at intervals that are time based, vehicle movement state based, sensed restraint condition based, and occupant movement based.

The present disclosure also contemplates that all the algorithms or methods, a portion of the algorithms or methods, all the associated sensors, or a portion of the sensors may go to sleep or be halted to save energy in select cases such as once the vehicle is moving. For example, the seatbelt buckle sensor may remain active but the seatbelt payout sensor and associated algorithms or methods may go to sleep or be deactivated while the vehicle is moving or until the vehicle re-enters a parked state.

In addition, messages and ride actions may be specific to the detected condition or a common approach can be taken. For instance, the standard buckle seatbelt icon in vehicles can be displayed if a misrouted seatbelt condition is detected. There can also be one or more time delays to run an algorithm, warn, or take vehicle action so that people have the ability to adjust their posture and nearby brought aboard personal objects in the vehicle including quickly reach for objects without causing a warning or a ride action to occur. These delays can be specific to certain parts of the algorithms, certain messages and certain ride actions. They can also be calibratable delays or the delays could be hard coded into the algorithm. In addition, the messages and ride actions may be applied in an escalating format where for instance, a visual warning is first communicated, followed by an audible message, followed by a haptic message, followed by a ride action that doesn't stop the vehicle, followed by a ride action that stops the vehicle. The delays between these events may be specific to certain parts of the algorithms or methods or calibratable delays or the delays may be hard coded into the algorithm or method.

In an embodiment of the present disclosure ride actions involve either enabling or suppressing certain deployable restraints such as one or more airbags or one or more seatbelt pretensioners. Ride actions can also involve enabling or suppressing customer convenience features, such as the ability to listen to audio or watch video on a screen.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting seatbelt routing in a motor vehicle safety restraint system, the system comprising:
   a seatbelt buckle sensor for sensing a presence of a seatbelt latchplate in the seatbelt buckle;
   an occupant sensor for sensing a presence of an occupant in a vehicle seat;
   a seatbelt payout sensor for sensing a seatbelt payout length;
   a control module in communication with the seatbelt buckle sensor, an occupant sensor, and the seatbelt payout sensor, wherein the control module wherein includes executable code to:
   determine whether the seatbelt is buckled;
   determine whether the occupant is detected in the vehicle seat;
   compare the seatbelt payout length to a first seatbelt payout length threshold;
   determine a seatbelt routing condition after determining the seatbelt is buckled, an occupant is present, and a seatbelt payout length has exceeded the first seatbelt payout length threshold; and
   issue a message to the occupant based on the determined seatbelt routing condition and when a seat corresponding to the seatbelt has not moved more than a seat movement threshold and a guide loop corresponding to the seatbelt has not moved more than a guide loop movement threshold.

2. The system of claim 1, wherein the control module further comprises executable code to: issue a ride action when the seat belt is not buckled and an occupant is detected.

3. The system of claim 2, wherein the control module further comprises executable code to: issue at least one of a message and a ride action when the seatbelt is buckled, an occupant is detected, and the stored static length is more than a first stored static length threshold and the seatbelt payout length is between a second and third pullout length threshold beyond the stored static length and a past seatbelt payout length was more than a first pullout length threshold beyond the stored static length.

4. The system of claim 1, wherein the control module further comprises executable code to: issue at least one of a message and a ride action when the seatbelt is not buckled, an occupant is not detected, and the seatbelt payout length is more than the first seatbelt payout length threshold.

5. The system of claim 1, wherein the control module further comprises executable code to: issue at least one of a message and a ride action when the seat belt is buckled, an occupant is detected and an occupant status has changed.

6. The system of claim 1, wherein the control module further comprises executable code to: issue at least one of a message and a ride action when the seat belt is buckled, an occupant is detected, an occupant status has not changed and seatbelt payout length has exceeded a change payout length threshold from a stored payout length.

7. The system of claim 1, wherein the control module further comprises executable code to: store in a computer memory of the control module the payout length from a past cycle when the seatbelt is buckled, an occupant is detected, an occupant status has not changed, and the seatbelt payout length has not changed more than a change payout threshold from the stored payout length.

8. The system of claim 1, wherein the control module further comprises executable code to: issue at least one of a message and a ride action when the seatbelt is buckled, an occupant is detected, and the seatbelt payout length has decreased more than a first payout length decrease threshold from a stored static length.

9. The system of claim 1, wherein the control module further comprises executable code to: issue at least one of a message and a ride action when the seat belt is buckled, an occupant is detected, and the seatbelt payout length has not decreased more than a first payout length decrease threshold from a stored static length and has decreased by more than a second payout length decrease threshold from the stored static length.

10. The system of claim 1, wherein the control module further comprises executable code to: issue at least one of a message and a ride action when the seatbelt is buckled, an occupant is detected, and a stored static length is more than a first stored static length threshold and the seatbelt payout length is greater than a first pullout length threshold beyond a stored static length.

11. The system of claim 1, wherein the control module further comprises executable code to: issue at least one of a message and a ride action when the seatbelt is buckled, an occupant is detected, and the stored static length is more than a first stored static length threshold and the seatbelt payout length is between a first and second pullout length threshold beyond the stored static length and a previously stored seatbelt payout length was less than the first static length threshold beyond the stored static length.

12. A method for detecting seatbelt routing in a motor vehicle safety restraint system, the method comprising:
   sensing a presence of a seatbelt latchplate in a seatbelt buckle;
   determining whether the seatbelt is buckled based on the presence of a seatbelt latchplate in a seatbelt buckle;
   sensing a presence of an occupant in a vehicle seat;
   determining whether the occupant is detected in the vehicle seat;
   sensing a seatbelt payout length;
   comparing the seatbelt payout length to a first seatbelt payout length threshold;
   determining a seatbelt routing condition after determining the seatbelt is buckled, an occupant is present, and a seatbelt payout length has exceeded the first seatbelt payout length threshold; and
   issuing a message to the occupant based on the determined seatbelt routing condition and when a seat corresponding to the seatbelt has not moved more than a seat movement threshold and a guide loop corresponding to the seatbelt has not moved more than a guide loop movement threshold.

13. The method of claim 12, further comprising issuing a ride action when the seat belt is not buckled and an occupant is detected.

14. The method of claim 13, further comprising issuing at least one of a message and a ride action when the seatbelt is buckled, an occupant is detected, and the stored static length is more than a first stored static length threshold and the seatbelt payout length is between a second and third pullout length threshold beyond the stored static length and a past seatbelt payout length was more than a first pullout length threshold beyond the stored static length.

15. The method of claim 12, further comprising issuing at least one of a message and a ride action when the seatbelt is not buckled, an occupant is not detected, and the seatbelt payout length is more than the first seatbelt payout length threshold.

16. The method of claim 12, further comprising issuing at least one of a message and a ride action when the seat belt is buckled, an occupant is detected and an occupant status has changed.

17. The method of claim 12, further comprising issuing at least one of a message and a ride action when the seat belt is buckled, an occupant is detected, an occupant status has not changed and seatbelt payout length has exceeded a change payout length threshold from a stored payout length.

18. The method of claim 12, further comprising saving the payout length from a past cycle when the seatbelt is buckled, an occupant is detected, an occupant status has not changed, and the seatbelt payout length has not changed more than a change payout threshold from the stored payout length.

19. The method of claim 12, further comprising issuing at least one of a message and a ride action when the seatbelt is buckled, an occupant is detected, and the seatbelt payout length has decreased more than a first payout length decrease threshold from a stored static length.

20. The method of claim 12, further comprising issuing at least one of a message and a ride action when the seat belt is buckled, an occupant is detected, and the seatbelt payout length has not decreased more than a first payout length decrease threshold from a stored static length and has decreased by more than a second payout length decrease threshold from the stored static length.

21. The method of claim 12, further comprising issuing at least one of a message and a ride action when the seatbelt is buckled, an occupant is detected, and a stored static length is more than a first stored static length threshold and the seatbelt payout length is greater than a first pullout length threshold beyond a stored static length.

22. The method of claim 12, further comprising issuing at least one of a message and a ride action when the seatbelt is buckled, an occupant is detected, and the stored static length is more than a first stored static length threshold and the seatbelt payout length is between a first and second pullout length threshold beyond the stored static length and a previously stored seatbelt payout length was less than the first static length threshold beyond the stored static length.

* * * * *